US012252382B1

(12) United States Patent
Warrier et al.

(10) Patent No.: US 12,252,382 B1
(45) Date of Patent: Mar. 18, 2025

(54) UNLOADING ROBOTS

(71) Applicant: Rightbot Technologies, Inc., Wilmington, DE (US)

(72) Inventors: Abhinav Warrier, Maharashtra (IN); Anurag Dutta, New Delhi (IN); Akash Singh, Telangana (IN); Vivek Bhagat, Bengaluru (IN)

(73) Assignee: Rightbot Technologies, Inc., Wilmington, DE (US)

( * ) Notice: Subject to any disclaimer, the term of this patent is extended or adjusted under 35 U.S.C. 154(b) by 0 days.

(21) Appl. No.: 18/828,867

(22) Filed: Sep. 9, 2024

Related U.S. Application Data

(60) Provisional application No. 63/675,670, filed on Jul. 25, 2024, provisional application No. 63/675,146, filed on Jul. 24, 2024.

(51) Int. Cl.
*B66F 9/19* (2006.01)
*B66F 9/06* (2006.01)
*B66F 9/12* (2006.01)

(52) U.S. Cl.
CPC ................ *B66F 9/19* (2013.01); *B66F 9/063* (2013.01); *B66F 9/125* (2013.01)

(58) Field of Classification Search
USPC ............... 414/437, 439, 440, 441, 391, 394; 198/308.1, 309, 506, 511, 519
See application file for complete search history.

(56) References Cited

U.S. PATENT DOCUMENTS 3,984,015 A * 10/1976 Sidelnikov ............ E02F 3/3483 198/511
8,651,794 B2 * 2/2014 Pippin .................... B65G 67/24 414/797.6
9,623,569 B2 * 4/2017 McCollum ............. B65G 67/24
9,650,215 B2 * 5/2017 Girtman ................. B25J 9/1679
9,969,573 B2 * 5/2018 Girtman .................... B25J 11/00
10,239,701 B2 * 3/2019 Wicks ..................... B25J 9/0093
11,434,090 B2 * 9/2022 Harres ................... B65G 65/02
11,667,476 B1 * 6/2023 Gil .......................... B65G 65/02 198/399
11,702,302 B2 * 7/2023 Wilson ................. B65G 65/005 700/230

(Continued)

FOREIGN PATENT DOCUMENTS

DE 202015009555 3/2018

OTHER PUBLICATIONS

[No Author Listed] [online], "Revolutionize Your Material Handling with Cascade-KOOI Rollerforks," Cascade Corporation, Internet Archive: Wayback Machine URL <https://web.archive.org/web/20240923195951/https://www.youtube.com/watch?v=iJtv2n3oPU4>, retrieved on Sep. 23, 2024, <https://www.youtube.com/watch?v=iJtv2n3oPU4>, 1 page [Video Submission].

(Continued)

*Primary Examiner* — Mark C Hageman
(74) *Attorney, Agent, or Firm* — Fish & Richardson P.C.

(57) ABSTRACT

A robotic system includes a mobile base assembly and a lifting assembly. The lifting assembly includes wedge blocks, each of which is pivotably connected to a front edge of the mobile base assembly and pivotable along a hinge axis. During an operation of the robotic system, at least a portion of the wedge blocks may be slid under the boxes to lift the boxes.

29 Claims, 13 Drawing Sheets

(56) References Cited

U.S. PATENT DOCUMENTS

| | | | | |
|---|---|---|---|---|
| 12,064,867 | B2 * | 8/2024 | Hartmann | B25J 15/12 |
| 2005/0053451 | A1 * | 3/2005 | Gagnon | B65G 67/20<br>414/400 |
| 2024/0189982 | A1 * | 6/2024 | Diankov | B25J 9/0093 |
| 2024/0217761 | A1 * | 7/2024 | Criswell | B25J 9/0093 |

OTHER PUBLICATIONS

Bloomberg.com [online], "New Siemens Unloading Robot," on or before May 7, 2019, via Internet Archive: Wayback Machine URL <https://web.archive.org/web/20190507005521/https://www.bloomberg.com/news/videos/2019-05-03/new-siemens-unloading-robot-video>, retrieved on Sep. 23, 2024, URL https://www.bloomberg.com/news/videos/2019-05-03/new-siemens-unloading-robot-video [Video Submission].

* cited by examiner

UNLOADING ROBOTS

CROSS-REFERENCE TO RELATED APPLICATIONS

This application claims the benefit of the filing dates of U.S. Provisional Application No. 63/675,146, filed on Jul. 24, 2024, and U.S. Provisional Application No. 63/675,670, filed on Jul. 25, 2024, the entire contents of each of which are incorporated herein by reference.

BACKGROUND

Currently, trailer unloading for floor-loaded goods is a manual process, in which manual operators pick the goods and unload the goods onto telescopic conveyors, flex conveyors, or pallets, which are subsequently handled and moved by forklifts or pallet jacks. These manual operations are highly strenuous and offer low-productivity. Industrially known equipment makes may make the operations ergonomic may further reduce productivity due to frequent adjustment of equipment, e.g., conveyor height.

Robots can be configured to perform unloading tasks in warehouse and dockyard environments. However, known robots interacting in warehouse and dockyard environments typically have complex mechanical designs, are too large and heavy to be practically fielded in loading/unloading settings (e.g., from trucks or ocean containers, or for case picking in warehouses), and are expensive to purchase and maintain. The use of robots configured to perform useful work in warehouse and dockyard environments under autonomous or remote operative control can further increase design complexity and costs.

Some unloading robots employ a pneumatic gripper mounted on a robotic arm for unloading. However, these grippers may be able to unload only carton boxes within certain weight limits (for example, 30 to 40 kg) and may fail to grip goods with unsuitable gripping surfaces. Some alternative solutions require a manual operator to topple the boxes onto a conveyor system to be processed by unloading equipment.

Further, some existing unloading solutions require an array of sensors to precisely detect positions of each box. The use of robotic arms and sensors may increase the cost of robotic system while providing only marginal improvements in productivity compared to manual operations.

SUMMARY

The present disclosure relates to a robotic system including a mobile base assembly and a lifting assembly movable with respect to the mobile base assembly. The mobile base assembly may be configured to move the robotic system with respect to a surface, and across a container, or a warehouse or a dockyard to access an ocean container or a truck containing the goods/samples to be unloaded. The mobile base assembly may include drive wheels to move the mobile base assembly in any direction, for example, a forward direction, a backward direction, as well as to turn the mobile base assembly in a clockwise or counterclockwise motion parallel to the surface, independent of an orientation of the robotic system. The drive wheels may include holonomic motion mechanism having one or more holonomic wheels, for example Mecanum or Omni wheels, each of which is adapted to be driven by an independently controlled motor, for example, a swerve motor. In an embodiment, the drive wheels may be regular cylindrical wheels driven by independently controlled motors, and each drive wheel may be mounted on an independently controlled swerve motor which can rotate the drive wheel about a vertical axis passing through the drive wheel's ground contact. In another embodiment, a differential tank drive may be implemented, in which a belt track system is provided on either side of the robotic system that facilitates moving the robotic system forward, backward or rotating the robotic system along an axis.

The robotic system further includes the lifting assembly configured to move relative to the mobile base assembly. The lifting assembly may be embodied as a collection of wedge blocks, each of which is connected to a front edge of the mobile base assembly. Each wedge block may be pivotably connected to the front edge of the mobile base assembly and the wedge block may be pivotable along a hinge axis. Each wedge block of the lifting assembly is made of a high-strength metal with hardened surfaces. Additionally, an anti-friction coating may be provided at least on top and bottom faces of the wedge block.

During an operation of the robotic system, the lifting assembly, specifically a portion of the wedge blocks, of the robotic system may be slid under the box/pile of boxes, and the wedge blocks may be actuated to lift the box/pile of boxes, and due to a further forward movement of the robotic system, the boxes slide towards a rear side of the mobile base assembly. The wedge blocks of the lifting assembly are adapted to individually and independently pivot around the hinge axis, at the front edge of the mobile base assembly. In accordance with the present disclosure, such a pivotal movement of the wedge block may be facilitated by an actuator. Further, each wedge block of the lifting assembly includes a spring-loaded retracting mechanism for retracting a front portion of the wedge block towards the rear portion of the wedge block, and thereby reduces the length of the wedge block and/or lifts the wedge block off the ground surface.

Additionally, gaps may be provided between two adjacent wedge blocks of the lifting assembly and the individual wedge block of the lifting assembly may be configured to move along a width-direction of the lifting assembly in order to align the lifting assembly across the entire width of the container from which the goods are to be unloaded.

The robotic system may further include a conveyor assembly having a plurality of conveyor belts that run across the top face of the mobile base assembly. The plurality of conveyor belts and the conveyor assembly are configured to move any goods/boxes placed thereon and guide the said goods/boxes outside the container towards the back of the robotic system. The robotic system may further include a set of guide plates, forming a funnel-type mechanism, for converging the unloaded goods from the width of the container to the narrower conveyor assembly at the back of the robotic system.

Further, the robotic system may include a blocking assembly arranged over the mobile base assembly and rearwardly of the lifting assembly. The blocking assembly is configured to allow free unloading of bottom-most goods of the pile of goods and restrict or resist movement of the goods positioned above the bottom-most goods. Accordingly, the blocking assembly offers gradual unloading of goods arranged as a pile of goods, in which once the bottom-most goods cross the blocking assembly and are transferred by the conveyor assembly, the next goods fall on the conveyor assembly and gets transferred to the rear side of the robotic system.

Furthermore, the robotic system may include a hinge provided on a chassis of the mobile base assembly to facilitate folding one-part of the robotic system at a hinge joint of the hinge in order to allow sufficient walking space for manual operators to enter the container for maintenance, inspection or other purposes.

Some aspects of the present disclosure relate to a robotic system including: a mobile base assembly configured to maneuver the robotic system about a floor surface; a lifting assembly at a front side of the robotic system, where the lifting assembly includes one or more wedge blocks, each wedge block of the one or more wedge blocks having a thickness that tapers toward a thin front edge of the wedge block; and one or more conveyer belts rearward of the lifting assembly. The one or more conveyer belts are configured to receive an item lifted by the one or more wedge blocks and move the item toward a rear side of the robotic system.

This and other robotic systems described herein can have one or more of at least the following characteristics.

In some implementations, the robotic system includes, for at least one wedge block of the one or more wedge blocks, an actuator configured to pivot the wedge block about a lateral axis.

In some implementations, the robotic system includes at least one actuator configured to translate at least one wedge block of the one or more wedge blocks, with respect to the mobile base assembly, laterally or along a forward/reverse direction.

In some implementations, each wedge block of the one or more wedge blocks includes a spring-loaded retracting mechanism, the spring-loaded retraction mechanism configured to retract a front portion of the wedge block toward a rear portion of the wedge block.

In some implementations, the robotic system includes a computing device configured to: receive sensor data indicative of a position of one or more items on the one or more conveyer belts; based on the position of the one or more items, identify a jam condition; and based on identifying the jam condition, control the one or more conveyer belts to relieve the jam condition.

In some implementations, the one or more wedge blocks includes a plurality of wedge blocks, each wedge block of the plurality of wedge blocks configured to pivot independently about a lateral axis.

In some implementations, the robotic system includes a computing device configured to control the robotic system to: slide the one or more wedge blocks under the item; and lift the item using the one or more wedge blocks, to cause the item to be transferred onto the one or more conveyer belts.

In some implementations, lifting the item using the one or more wedge blocks includes using the mobile base assembly to move the robotic system forward, such that the item slides up on the one or more wedge blocks.

In some implementations, lifting the item using the one or more wedge blocks includes moving the one or more wedge blocks independently of the mobile base assembly.

In some implementations, moving the one or more wedge blocks includes rotating the one or more wedge blocks up about a lateral axis.

In some implementations, the robotic system includes a barrier arranged over the mobile base assembly and rearward of the lifting assembly. The barrier is configured to restrict movement of goods positioned over bottom-most goods in a pile of goods lifted by the one or more wedge blocks.

In some implementations, the barrier includes at least one flexible hanging member.

In some implementations, the barrier is configured to controllably raise and lower.

In some implementations, the robotic system includes at least one barrier configured to funnel goods arranged across a width of the lifting assembly, to cause the goods to be arranged across a narrower width at the rear side of the robotic system.

In some implementations, a first wedge block of the one or more wedge blocks includes an inflatable section configured to lift the item by inflating.

In some implementations, each wedge block of the one or more wedge blocks has a length in a range from 150 mm to 250 mm.

In some implementations, each wedge block of the one or more wedge blocks has a width less than 100 mm.

In some implementations, the robotic system includes a suspension system arranged at a lateral side of the robotic system to contact walls.

In some implementations, the one or more wedge blocks include a plurality of wedge blocks, and adjacent wedge blocks of the plurality of wedge blocks are separated from one another by a distance in a range from 3 mm to 7 mm.

In some implementations, each wedge block of the one or more wedge blocks includes a low-friction material at a front portion of the wedge block.

In some implementations, the one or more wedge blocks include a first set of one or more wedge blocks and a second set of one or more wedge blocks. The robotic system includes a computing device configured to control the robotic system to, in order: (i) move the first set forward and up; (ii) move the second set forward and up; (iii) lower the first set; and (iv) move the first set forward and up.

In some implementations, lowering the first set includes lowering the first set to contact the floor surface.

In some implementations, the computing device is configured to control the robotic system to, after previous (iv), (v) lower the second set; (vi) move the second set forward and up; and continue repeating (iii)-(vi) while moving the robotic system forward using the mobile base assembly.

In some implementations, moving the first set forward and up includes moving the first set forward by between 1 mm and 10 mm.

In some implementations, the first set of one or more wedge blocks and the second set of one or more wedge blocks alternate with one another along a lateral direction.

Some aspects of this disclosure relate to a method of controlling a robotic system. The robotic system includes a lifting assembly at a front side of the robotic system. The lifting assembly includes a first set of lifting members and a second set of lifting members configured to lift item. The method includes, in order: (i) moving the first set forward and up; (ii) moving the second set forward and up; (iii) lowering the first set; and (iv) moving the first set forward and up.

This and other methods described herein can have one or more of at least the following characteristics.

In some implementations, lowering the first set includes lowering the first set to contact a floor surface on which the robotic system is arranged.

In some implementations, the method includes. after (iv): (v) lowering the second set; (vi) moving the second set forward and up; and continuing to repeat (iii)-(vi) while moving the robotic system forward.

In some implementations, moving the first set forward and up includes moving the first set forward by between 1 mm and 10 mm.

In some implementations, the first set of lifting members and the second set of lifting members alternate with one another along a lateral direction.

In accordance with the present disclosure, the design of thin-front-edged wedge blocks of the lifting assembly may work with or without slip-sheets placed below goods as is essentially required in the conventionally known unloading equipment/robotic system. Also, the design of the thin-edged wedge blocks makes unloading operations independent of the type, size, or shape of goods or orientation of the goods inside the container. The goods may include, but not limited to, tires, jute bags, cement bags, pouches, bottles, carton boxes, etc. The retraction mechanism of individual wedge block allows the robotic system to work even in the presence of a few protruding elements or obstacles on the floor of the container.

Further, the conveyor assembly provided behind the wedge blocks facilitates continuous operation of unloading the goods from the container.

Moreover, once the robotic system of the present disclosure aligns with the container, the robotic system enters the container at a constant speed and the goods are unloaded automatically and gradually. Accordingly, the robotic system of the present disclosure may or may not implement any sensors to locate any goods inside the container before unloading. The robotic system of the present disclosure does not require any modifications to be made to trailers or the way goods are placed inside them, and thus does not necessitate placing the goods on a slip sheet, a belt that can be pulled, or on a conveyor belt system inside the container.

Additionally, since the robotic system of the present disclosure may work with or without gripping the goods for unloading operation, said robotic system may or may not implement any robotic manipulator, pneumatic or mechanical grippers.

Further, the wedge blocks of the robotic system may have an inflatable material which gets inflated once the wedge blocks are placed and slid under the bottom-most goods. The inflated material lifts the goods and makes it easier for the rest of the wedge blocks to slide below the goods.

The provision of folding the robotic system facilitates providing access to manual operators to enter inside the container in case the robotic system fails to operate. Once the manual operator resolves the issue, they can unfold the robotic system, and the robotic system will continue the unloading operation.

It is to be understood that the aspects and embodiments of the disclosure described above may be used in any combination with each other. Several of the aspects and embodiments may be combined together to form a further embodiment of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
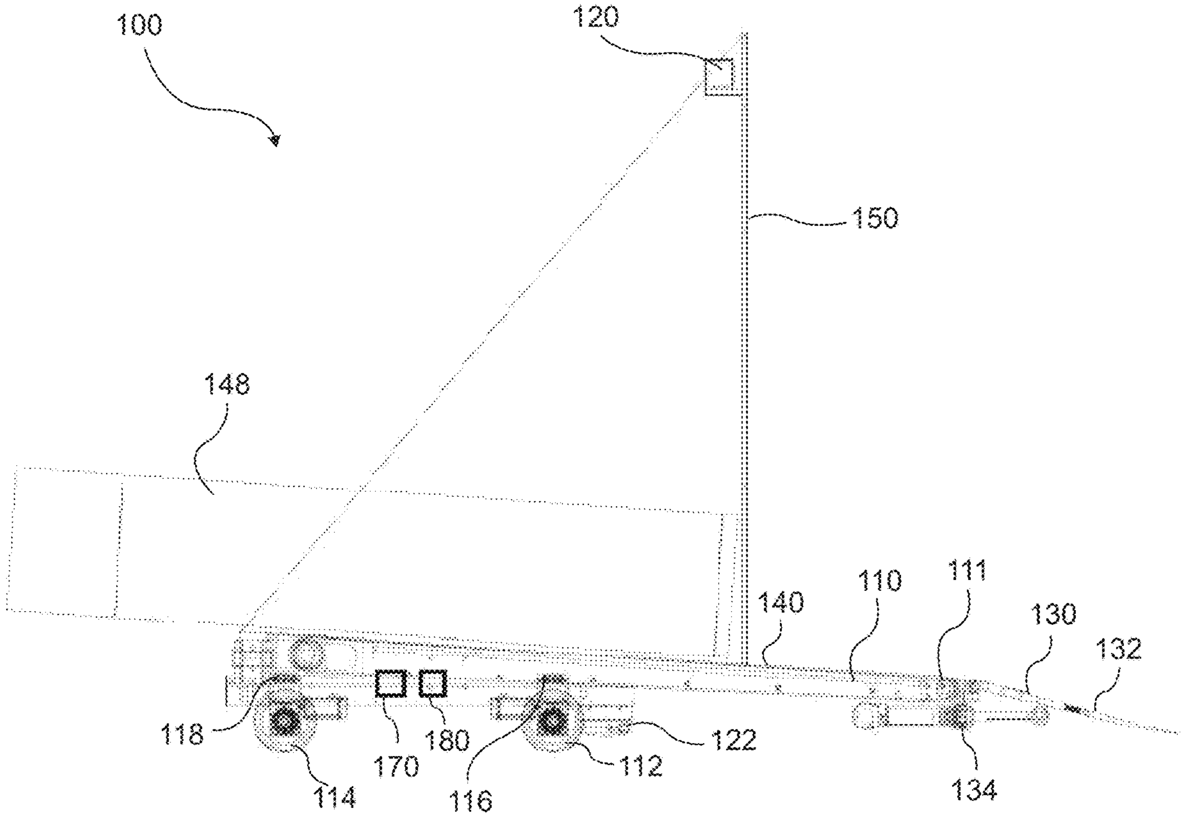
FIG. 1 is a side view of an example of a robotic system.

It will be understood that elements in the drawings are illustrated for simplicity and have not necessarily been drawn to scale. For example, the dimensions of some of the elements in the drawings may be exaggerated relative to other elements to help to improve understanding of embodiments of the present disclosure.

DETAILED DESCRIPTION

Specific examples according to this disclosure are described below. It should be understood, however, that various modifications, equivalents, and alternatives are also within the scope of the present disclosure.

As noted above, some existing robotic unloading solutions are limited in throughput. For example, systems that rely on holding or attaching to each individual item to be unloaded (e.g., using an arm with a suction attachment) may be limited by (i) the need to precisely detect the presence and position of each item to permit accurate handling, and/or (ii) the difficulty in holding or attaching to various types of goods, which may have widely-varying form factors. For example, the same robot may need to grasp conventional boxes, tires, and bags of sand or rice during a single unloading operation. The systems, structures, mechanisms, and processes described herein can be used to unload and transfer a variety of different items, including boxes, bags, pallets, single packaged items, etc. “Item,” “goods,” “box,” and other examples of transferred and/or unloaded items described herein should be understood as non-limiting, generic terms to encompass any item that may be handled by the robotic systems described herein.

Some implementations according to this disclosure provide robots and associated methods based on an alternative goods-handling process. As described herein, robots can insert thin-tipped wedges underneath goods to scoop the goods and seamlessly transfer the goods onto a robot-mounted conveyer belt. In some cases, a single scooping operation may result in multiple stacked goods being transferred to the conveyer belt at once, greatly improving throughput compared to robots that rely on individual handling of each item. In some implementations, a blocking assembly delimits movement of goods during transfer, reducing or preventing damage to goods that may fall during the transfer process. In some implementations, a series of conveyor belts working synchronously along with jam-detecting sensors can be used. In such arrangements, the plurality of conveyor belts can be controlled such that goods are transported without blockage/damage based on feedback from sensors. In some implementations, a precisely-controlled movement routine is used to compensate for possible floor-surface irregularities and item fragility.

FIG. 1 illustrates an example of a robotic system 100. The robotic system 100 includes a mobile base assembly 110 and a lifting assembly 130 coupled to a front portion of the mobile base assembly 110. The lifting assembly 130 is movable with respect to the mobile base assembly 110. The mobile base assembly 110 may be configured to move the robotic system 100 with respect to a surface, for example, the ground surface, on which the robotic system 100 is located. The mobile base assembly 110 may enable the robotic system 100 to be placed in proximity to an object or environment associated with a task to be performed by the robotic system 100. For example, the mobile base assembly 110 may cause the robotic system 100 to move across a container, or across a warehouse or a dockyard to access an ocean container or a truck containing goods to be unloaded.

In some implementations, as shown in FIG. 1, the mobile base assembly 110 includes drive wheels, for example, a first drive wheel 112 and a second drive wheel 114. The first drive wheel 112 may be coupled to a first drive motor 116 and the second drive wheel 114 may be coupled to a second drive motor 118. The first drive motor 116 and the second drive motor 118 may, respectively, drive the first drive wheel 112 and the second drive wheel 114 in order to move the mobile base assembly 110 in any direction, for example a forward direction, a backward direction, as well as to turn the mobile base assembly 110 in a clockwise or counter-clockwise motion parallel to the surface on which the mobile base assembly 110 is located, independent of an orientation of the robotic system 100. In some implementations, the first drive motor 116 and the second drive motor 118 operate in unison. In some implementations, the first drive motor 116 and the second drive motor 118 can operate independently of one another. In some implementations, the first drive motor 116 and/or the second drive motor 118 are coupled, respectively, to the first drive wheel 112 and/or the second drive wheel 114 via a differential transmission.

In some implementations, the first drive wheel 112 and the second drive wheel 114 of the mobile base assembly 110 include a holonomic motion mechanism having one or more holonomic wheels, for example, Mecanum or Omni wheels, each of which is adapted to be driven by an independently-controlled motor, for example, a swerve motor. Such wheels can provide additional degrees of freedom for robot movement, reducing movement constraints. For example, the holonomic motion mechanism can allow the robotic system 100 to travel easily in tight spaces and to move from one dock or truck-bed to another. In some implementations, the holonomic motion of the robotic system 100 is achieved via a swerve drive system. A regular cylindrical wheel is rotated along a first axis by a first motor, and the wheel is mounted on a swerve assembly in which a second motor revolves the wheel around a vertical axis passing through ground contact. The swerve action facilitates orienting the driving wheel in a desired orientation. For example, the robotic system 100 (e.g., the mobile base assembly 110) can include four swerve assemblies having four drive wheels, four corresponding drive motors, and four swerve motors. In some implementations, a differential tank drive may be implemented, in which a belt track system is provided on either lateral side of the robotic system 100. The belt track system facilitates moving the robotic system 100 forward, backward or rotating the robotic system about a vertical axis.

In some implementations, the mobile base assembly 110 is considered to be holonomic if the controllable degrees of freedom for movement are equal to the total degrees of freedom. Such a mobile base assembly 110 may translate in any direction while simultaneously rotating. This is different than most types of ground vehicles, such as car-like vehicles, tracked vehicles, or wheeled differential-steer (skid-steer) vehicles, which cannot translate in any direction while rotating at the same time. In some implementations, the mobile base assembly 110 is configured to be driven on a levelled surface. In some implementations, the mobile base assembly 110 is configured to be driven on an unlevelled surface.

In some implementations, the mobile base assembly 110 includes a battery and a computing device 170 mounted on a base platform. The battery may provide power to the computing device and any of the drive motors 116, 118 and/or swerve motor and sensors of the robotic system 100. In some implementations, the battery includes one or more batteries or one or more battery packs to allow better distribution of mass across the mobile base assembly 110. In some implementations, the battery includes a sealed lead acid battery or a Lithium-ion battery or Lithium Iron Phosphate battery. The computing device 170 may include a processor, a memory, a communication interface, and one or more I/O interfaces. The memory can store computer-readable and executable instructions, which, when executed by the processor, cause the robotic system 100 to operate in an autonomous or semi-autonomous manner in regard to a particular task or in regard to sensor data received by the processor from one or more sensors of the robotic system 100. The computing device 170 need not be included in the mobile base assembly 110 but, rather, can be arranged in various locations in and/or on the robotic system 100. Further details on the computing device 170 are provided below.

The mobile base assembly 110 may include sensors including, but not limited to, a laser rangefinder, camera 120, LIDAR 122, inertial measurement unit (IMU), proximity sensor, limit switch, bumper sensor, infrared sensor, ultrasonic sensor, and/or a sonar sensor. A limit switch provides data indicating whether the switch is being pressed by an item. The laser rangefinder can spin to collect sensor data associated with a two-dimensional (2D) depth map of an environment, for example, the dockyard, warehouse, ocean container or truck, in which the robotic system 100 is operating. The design of the mobile base assembly 110 allows the laser rangefinder to collect sensor data over a wide field of view. LIDAR(s) 122 facilitate tracking side walls of the container to navigate the robotic system 100 inside a container or other enclosure. Camera(s) 120 aid in observing the flow and locations of goods and identifying any issues in unloading of the goods. The cameras 120 can detect locations of goods prior to interaction with the robotic system 100 and/or when being handled by the robotic system 100, e.g., to determine a position of an item on a wedge block 132 or a conveyer belt 142.

Figure 2:
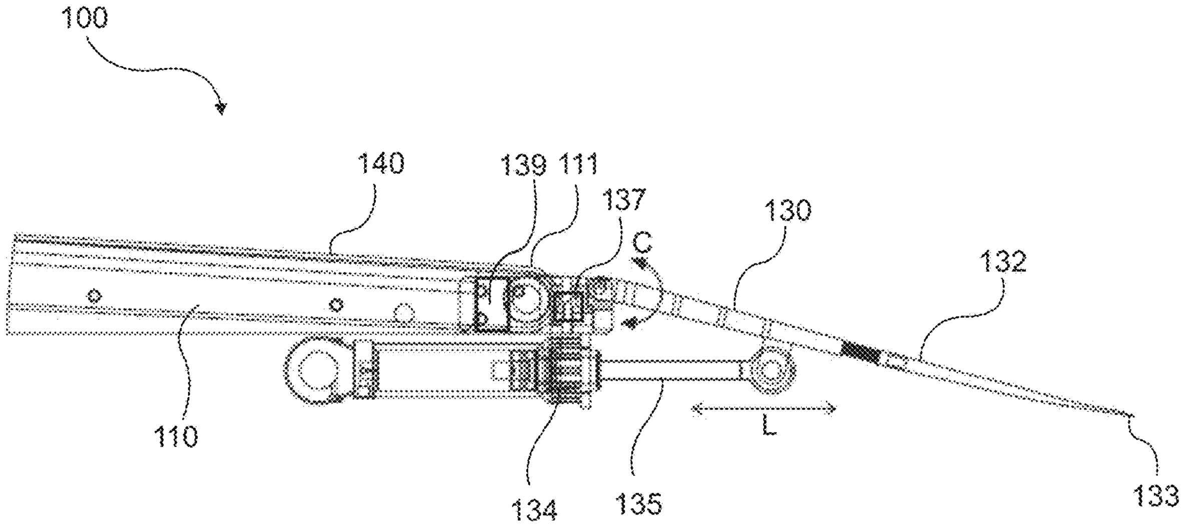
FIG. 2 is an enlarged side-view of a front portion of the robotic system of FIG. 1.
Figure 3:
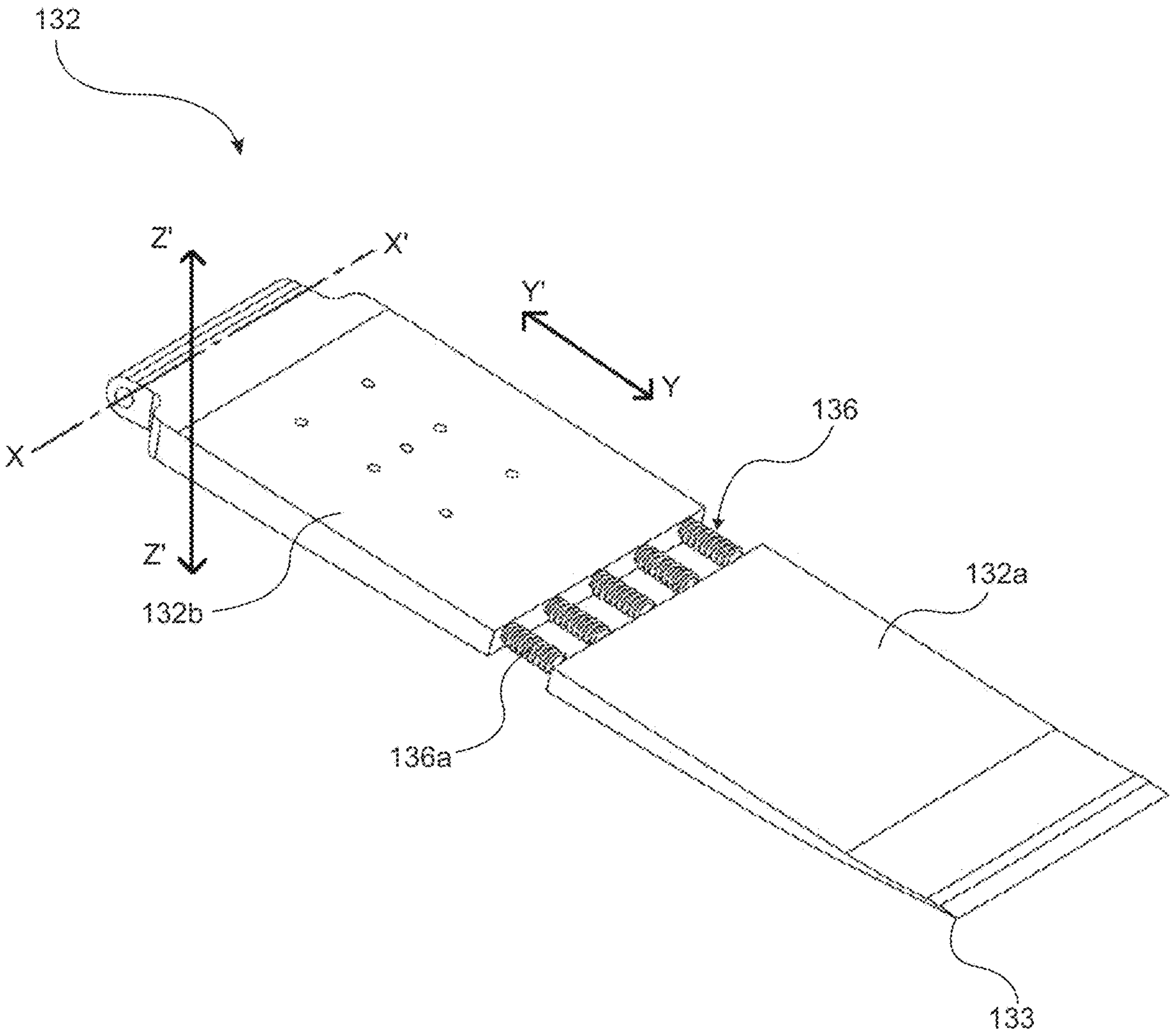
FIG. 3 is a perspective view of a wedge block of the lifting assembly of the robotic system of FIG. 1.

Referring to FIGS. 1 and 2, the robotic system 100 further includes the lifting assembly 130 configured to move relative to the mobile base assembly 110. The lifting assembly 130 may be coupled to the front portion of the mobile base assembly 110. In some implementations, the lifting assembly 130 includes one or more wedge blocks 132, each of which is connected to a front edge 111 of the mobile base assembly 110. Each wedge block 132 may be pivotably connected to the front edge 111 of the mobile base assembly 110, and the wedge block 132 may be pivotable along a hinge axis (X-X'), as shown in FIG. 3. In some implementations, each wedge block 132 is pivotable independently of one another.

In some implementations, each wedge block 132 has a width (along the X-X' axis) in a range from 5 mm to 50 mm, from 10 mm to 100 mm, from 10 mm to 50 mm, or from 75 mm to 125 mm. In some implementations, each wedge block 132 has a length (along the Y-Y' axis) in a range from 150 mm to 250 mm. In some implementations, each wedge block 132 has a thickness (along the vertical axis Z-Z') in a range from 30 mm to 70 mm. These values have been found to satisfy constraints associated with mounting the wedge blocks, ensure gradual lifting of items, and result in items being transferred efficiently to the conveyor assembly 140. In some implementations, a narrower wedge block 132 (e.g., with a width less than or equal to 125 mm, 100 mm, 75 mm, 50 mm, or 25 mm) can provide improved effectiveness in handling/transferring items. In some implementations, a shorter wedge block (e.g., less than 250 mm, less than 200 mm, or less than 150 mm) can advantageously promote transfer of small items.

In addition to or instead of independent movement of the wedge blocks 132 (discussed in more detail below), in some implementations, the lifting assembly 130 (including the wedge blocks) is configured to move as a whole with respect to the mobile base assembly 110. For example, an actuator 139 (represented schematically in FIG. 2) can mechanically couple the lifting assembly 130 to the mobile base assembly 110 and can be controlled (e.g., by computing device 170) to move the lifting assembly 130 laterally, vertically, and/or forward/backward with respect to the mobile base assembly 110. In some implementations, the computing device 170 is configured to use the actuator 139 to lift the lifting assembly 130 to an elevated position, for example (i) when the robotic system 100 is ascending a ramp such as a dock ramp, to assist in unobstructed movement, and/or (ii) to align the lifting assembly 130 with a target elevation, such as the starting point of a trailer or an elevated at which items to be unloaded are located.

Referring to FIG. 3, an example of a wedge block 132 of the lifting assembly 130 is illustrated. The wedge block 132 is configured to be pivotably coupled to the front edge 111 of the mobile base assembly 110 along the hinge axis (X-X'). In some implementations, each wedge block 132 is translatable in one or more directions. For example, one or more motors can be configured to translate the wedge blocks 132 laterally along the X-X' axis (as a group and/or individually with respect to one another to adjust a spacing between adjacent wedge blocks 132). As another example, one or more motors can be configured to translate the wedge blocks 132 vertically along a vertical axis Z-Z' perpendicular to the X-X' axis, as a group and/or individually. As another example, one or more motors can be configured to translate the wedge blocks 132 forward/backward along a forward/backward axis Y-Y' perpendicular to the X-X' and Z-Z' axes. This forward/backward motion can be motion caused by the retracting mechanism 136 (e.g., such that the motors is a motor of the retracting mechanism 136) or motion caused by another motor and actuator mechanism. Mechanism(s) that can cause movement of the wedge blocks 132 laterally, vertically, and/or forward/backward are illustrated schematically in FIG. 2 as actuators 137, which can represent one actuator or multiple distinct actuators. These actuators 137 and the other actuators described herein can use any suitable mechanism and motion, e.g., a spring-loaded actuator, an electrical actuator, a pneumatic actuator, or a hydraulic actuator, to cause rotational and/or linear motion to effect the lateral, vertical, and/or forward/backward movements.

In some implementations, the geometric parameters of the wedge blocks 132 and the lifting assembly 130 are such that the lifting assembly 130 is configured to cover and/or extend across an entire width of a container from which goods are to be unloaded. For example, a width of the wedge block 132, a gap between adjacent wedge blocks 132, and a number of wedge blocks 132 in the lifting assembly 130 may result in the lifting assembly 130 extending across an entire width of the container. In some implementations, adjacent wedge blocks 132 are separated from one another by a distance in a range from 3 mm to 7 mm.

In some implementations, each wedge block 132 of the lifting assembly 130 is made of a high-strength metal (e.g., stainless steel) with hardened surfaces. In some implementations, an anti-friction coating may be provided at least on top and/or bottom faces of the wedge blocks 132 of the lifting assembly 130. A top coating can permit the wedge block 132 to slide more easily against goods above the wedge block 132, and a bottom coating can permit the wedge block 132 to slide more easily against floor surfaces. In some implementations, a front portion of the wedge block 132 or a complete wedge block 132 can be composed of Teflon or another low-friction soft material to reduce damage to goods and floor surfaces.

During an operation of the robotic system 100 (for example, when lifting a box or a pile of boxes to unload a container), at least a portion of the wedge blocks 132 are slid under an item or pile/stack of goods, and the wedge blocks 132 are actuated to lift the goods. The wedge blocks 132 are shaped as tapering wedges with thin front edges 133 that permit the front edges 133 to be slid into the very narrow spaces that, in almost all cases, are found between goods and an underlying floor surface. The front edges 133 can be fillets. In some implementations, the fillet radius is between 0.1 mm and 0.3 mm. In some implementations, the wedge blocks 132 have a taper angle in a range from 1.8° to 2.8°. These values have been found to provide effective lifting and transfer of items and to permit the wedge blocks 132 to reliably be inserted under items.

Once the front edge 133 is under a good, the wedge block 132 can be moved forward (e.g., by translation of the robotic system 100 using the mobile base assembly 110, or independently), pivoted about the X-X' axis, and/or translated upward vertically along the Z-Z', to cause the item to move further up and along the wedge block 132. A single wedge block 132 can be moved under an item or pile/stack of goods, and/or multiple wedge blocks 132 can be simultaneously moved under the item or pile/stack of goods.

As a result of one or more of the foregoing movements (e.g., forward movement of the robotic system 100 and/or movement of the wedge blocks 132), the item or pile/stack of goods is slid towards a rear side of the mobile base assembly 110. For example, referring again to FIG. 2, the wedge blocks 132 may be controlled (e.g., based on signals/commands from the computing device 170) to rotate in the counter-clockwise direction (as shown with curved arrow 'C') to lift a good, leading to movement of the item towards the rear side of the mobile base assembly 110.

As noted above, referring to FIGS. 2 and 3, in some implementations the wedge blocks 132 of the lifting assembly 130 are adapted to individually and independently pivot around the hinge axis (X-X') at the front edge 111 of the mobile base assembly 110. In some implementations, this pivoting movement of the wedge block 132 is caused by an actuator 134, as shown in FIG. 2. The actuator 134 may include, but not limited to, a spring-loaded actuator, an electrical actuator, a pneumatic actuator, or a hydraulic actuator. In the example of FIG. 2, the actuator 134 is a pneumatic actuator 134 that controls a linear movement of a member 135 (e.g., a rod) along the straight arrow 'L'. The member 135 is pivotably coupled to the wedge block 132, such that the linear movement of the member 135 causes a pivoting motion of the wedge block 132. In some implementations, the lifting assembly 130 includes one or biasing elements, in addition to the actuator 134, that facilitate and ensure that a front edge 133 of the wedge block 132 touches the floor of the container. The one or more biasing elements can include any mechanism that moves the lifting assembly 130 or a portion thereof, e.g., spring-loaded retracting mechanism 136, and/or actuators 134, 137, and/or 139. Also, in some implementations, the pivoting motion of the wedge block 132 (e.g., by virtue of linear movement of the actuator 134) facilitates avoiding any obstruction (for example, bolts, weld seams, or any protruding object) on the floor surface of the container or the ground, to reduce or prevent the collision between the front edge 133 and the floor surface or obstruction, and/or to reduce or prevent harmful collisions between the wedge block 132 and goods, helping to manage any unevenness of the floor surface. Further details on control of the wedge blocks are discussed below in reference to FIG. 6.

Referring to FIG. 3, in some implementations, at least one wedge block 132 of the lifting assembly 130 optionally includes a spring-loaded retracting mechanism 136. The retracting mechanism 136 may be actuated electrically or hydraulically, e.g., based on signals/commands from the computing device 170, or can be passive (operating only based on the force of springs). The spring-loaded retracting mechanism 136 can be used to retract a front portion 132*a* of the wedge block 132 towards a rear portion 132*b* of the wedge block 132, thereby reducing the length of the wedge block 132 and/or lifting the wedge block 132 off the floor surface. For example, during a forward motion of the robotic system 100, when the wedge block 132 touches any obstacle on the floor surface, the spring 136*a* may be compressed in response to a force between the front portion 132*a* and the obstacle, thereby retracting the front portion 132*a* of the wedge block 132 towards the rear portion 132*b* of the wedge block 132.

As another example, while one or more wedge blocks 132 of the lifting assembly 130 are in a retracted position, remaining wedge block(s) 132 may remain in their original (e.g., unretracted) position and be slid under goods during forward motion of the mobile base assembly 110 or the robotic system 100. After the remaining wedge blocks 132 have traveled further in the forward direction, all the wedge blocks 132 (including the retracted wedge block(s) 132) of the lifting assembly 130 may be lifted using their respective actuators 134 and/or 137 (e.g., as described in conjunction with the process 600), so that the obstruction on the floor may be avoided. Once the obstacle is avoided, all the wedge blocks 132 would be lowered down, again touching the floor of the container.

The spring-loaded retracting mechanism 136 of each wedge block 132 can permit each wedge block 132 to retract individually, e.g., based on whether the wedge block 132 encounters an obstacle. In some implementations, the spring-loaded retracting mechanism 136 permits retraction to a maximum distance in a range from 3 mm to 20 mm, from 3 mm to 10 mm, from 5 mm to 20 mm, from 10 mm to 20 mm, or from 10 mm to 30 mm. These distances have been found to be compatible with forward-movement step sizes that provide a desired high rate of unloading, and to also provide acceptable mechanical behavior of the wedge blocks 132 while reducing or avoiding damage caused by obstacles.

In some implementations, one or more conveyers (e.g., a conveyer belt) are provided on an upper surface of the wedge block 132, e.g., on upper surface(s) of one or both of the front portion 132*a* and the rear portion 132*b*. The conveyer can be controlled (e.g., by the computing device 170) to transfer, rearward, items on the wedge block 132. The conveyer can extend and be configured to move along the forward/rearward direction, (e.g., along the Y-Y' axis).

In some implementations, gaps are provided between two adjacent wedge blocks 132 of the lifting assembly 130, and each individual wedge block 132 may be controlled to move along a width-direction of the lifting assembly 130, e.g., along the front edge 111 of the mobile base assembly 110/along the X-X' axis. The lifting assembly 130 may further include one or more actuators, for example, spring-loaded, electrical, or hydraulic actuators, that can be controlled (e.g., by the computing device 170) to move the wedge blocks 132 of the lifting assembly 130 along the width-direction thereof. In some implementations, the wedge blocks 132 can be moved along the width direction, using the corresponding actuators, to (i) align the lifting assembly 130 across an entire width of the container from which the goods are to be unloaded, (ii) arrange the wedge blocks 132 in front of one or more target goods or set of goods, and/or (iii) avoid the wedge blocks 132 colliding with obstructions while the robotic system 100 travels.

In some implementations, the computing device 170 receives data from one or more sensors of the robotic system 100 (e.g., the laser rangefinder, the camera 120, the LIDAR 122, IMU, proximity sensor, limit switch, bumper sensor, infrared sensor, ultrasonic sensor, and/or sonar sensor), and uses the sensor data to determine a width and/or position of a container in which goods are located, position(s) of one or more goods to be unloaded, and/or position(s) of one or more obstacles. Based on the determined width and/or positions, the computing device 170 can control the actuators to: align the wedge blocks 132 with the container and/or cause the wedge blocks 132 to extend across an entirety of the container; laterally align one or more wedge blocks 132 with the goods, so as to unload the goods; and/or move one or more wedge blocks 132 out of lateral alignment with the obstacle, so that the wedge blocks 132 do not collide with the obstacle.

Figure 10A:
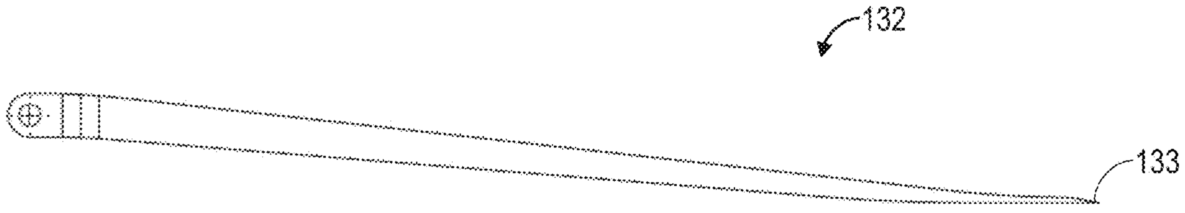
FIGS. 10A-10B are side views of an example of a wedge block.
Figure 10B:
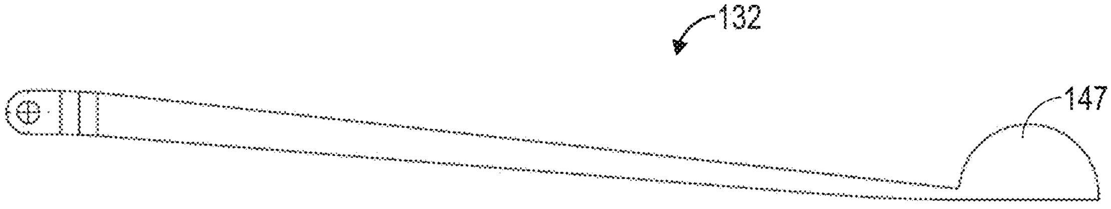

In some implementations, one or more of the wedge blocks 132 includes an inflatable section which is inflated when the wedge block 132 has been slid under goods, e.g., under the bottom-most goods of a stack of goods. The inflated section lifts the goods and makes it easier for the rest of the wedge blocks 132 to slide below the goods. For example, FIGS. 10A-10B illustrate an example of a wedge block 132 including an inflatable section 147, shown in a side view. In FIG. 10A, the inflatable section 147 is deflated, such that the front edge 133 of the wedge block 132 can slide under items. In FIG. 10B, the inflatable section 147 is inflated, causing an item on the inflatable section 147 to be lifted by the inflatable section 147 and more easily transferred rearward. The inflatable section 147 can inflate based on a command/signal provided by the computing device 170.

In some implementations, the goods inside a trailer, container, or other enclosure are placed on a corrugated sheet. For example, the corrugated sheets can be placed throughout the floor of the trailer/container. The wedge blocks 132 of the robotic system 100 may be adjusted to slide under the corrugated sheet on which the goods are placed. Upon the further forward movement of the robotic system 100 inside the trailer/container, the corrugated sheet and thus the goods travel towards the rear side of the mobile base assembly 110, so as to arrive at a conveyor assembly disposed downstream of the mobile base assembly 110 for unloading the goods outside the trailer or the container.

In some contexts—for example, when unloading goods from trailers or containers with uneven floor surfaces or floor debris—there is an increased likelihood that the front edges 133 of the wedge blocks 132 may collide directly into goods rather than sliding under the goods. Given the thinness of the front edges 133, the front edges 133 may penetrate into or otherwise damage the goods. At least to reduce the likelihood of this damage, in some implementations, the robotic system 100 is configured to implement a specific synchronized motion of the wedge blocks 132.

Figure 6:
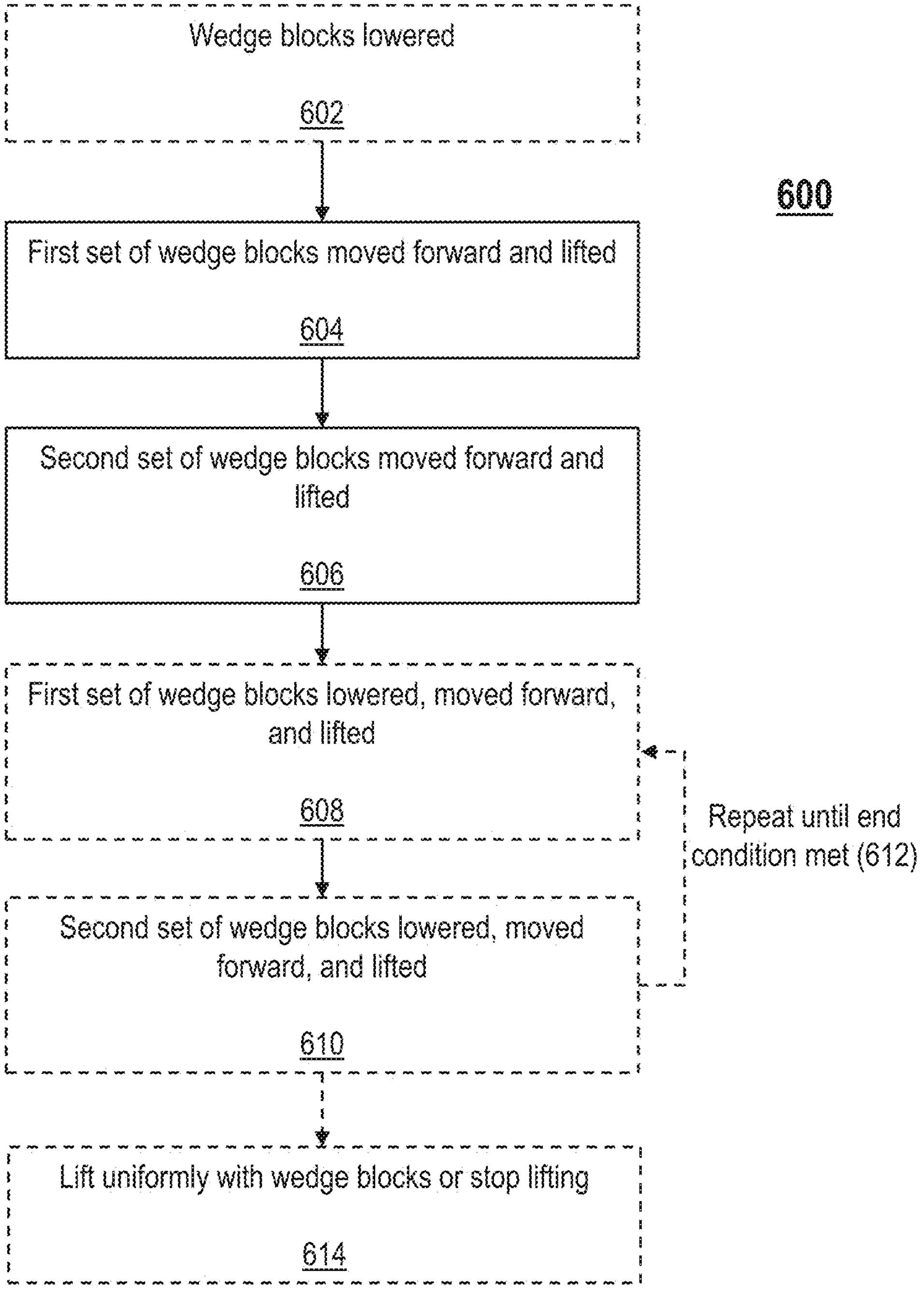
FIG. 6 is a diagram illustrating an example of an unloading method.

An example of this synchronized unloading process 600 is shown in FIG. 6. The process 600 can be performed, for example, by the robotic system 100 based on commands/signals provided by the computing device 170. As shown in FIG. 6, in the process 600, optionally, a group of wedge blocks 132 is lowered (602). For example, the wedge blocks 132 can be lowered until they touch a floor surface, are at a lower limit of their movement range, or are at or within a predetermined distance from the floor surface. "Raised/lifted" and "lowered," with reference to the process 600, can include rotary motion as described in reference to FIG. 2 (e.g., using the actuator 134) and/or vertical, translational motion using actuator 137. The group of wedge blocks 132 can be all wedge blocks 132 of the robotic system 100 or a subset thereof. In the subsequent description of the process 600, "the wedge blocks 132" refers to this group of wedge blocks 132, which may or may not be all of the wedge blocks 132.

In some implementations, operation 602 need not be actively performed. For example, the wedge blocks 132 can naturally be in the lowered position when operation 604 is initiated. The wedge blocks 132 can be at a common vertical level and/or a common position along a forward/backward direction.

A first set of the wedge blocks 132 is moved forward by a small distance (e.g., along the Y-Y' axis) and then lifted (604). The first set is a strict subset of the wedge blocks 132 and includes one or more wedge blocks 132. In some implementations, the first set includes alternative wedge blocks of the wedge blocks, e.g., every other edge block. In some implementations, the first set includes at least two adjacent edge blocks. The first set can be moved forward by the small distance so as to move under an item to be unloaded, and then be raised to as to lift the item. The small distance can be, for example, in a range from 1 mm to 5 mm, from 1 mm to 10 mm, from 3 mm to 20 mm, from 3 mm to 10 mm, from 5 mm to 20 mm, from 10 mm to 20 mm, or from 10 mm to 30 mm. In some implementations, the first set is lifted by a distance in range from 1 mm to 5 mm, from 1 mm to 10 mm, from 5 mm to 20 mm, from 10 mm to 20 mm, from 10 mm to 30 mm, from 10 mm to 50 mm, or another distance. These distance ranges have been found to be large enough to facilitate high unloading throughput, while being small enough to avoid damage to the item in the case where the wedge blocks 132 collide with the item. The lifting distance refers to a distance by which a distal end of each wedge block 132 (e.g., the front edge 133) is lifted.

A second set of the wedge blocks 132 is moved forward and lifted (606). The second set of wedge blocks can be all remaining wedge blocks of the group of wedge blocks 132 (that is, the wedge blocks 132 excluding the first set of wedge blocks 132). The second set can include one or more wedge blocks 132. In some implementations, the second set of wedge blocks 132 is moved forward and lifted to reach the same forward and vertical positions as the first set of wedge blocks. For example, after the first set has been moved, the second set can be moved forward between 1 mm and 5 mm or between 1 and 10 mm, and the second set can be moved up between 1 mm and 5 mm or between 1 and 10 mm. Accordingly, the second set moves to a position where the second set holds the item that was previously held only by the first set.

The movement of the second set (606) can occur entirely or partially after movement of the first set (604). For example, the movement of the second set (606) can occur after the first set has reached its target position. The movement of the second set (606) can occur entirely after the first set has moved forward (604), entirely after the first set has been lifted (604), or both. The movement of the second set (606) can occur entirely after the first set has moved forward by a distance in any of the ranges discussed for forward movement with respect to operation 604, entirely after the first set has been lifted by a distance in any of the ranges discussed for vertical movement with respect to operation 604, or both. The movement of the second set (606) can begin after movement of the first set (604) has begun.

Continuing in reference to FIG. 6, optionally, the first set of wedge blocks 132 is lowered, moved forward again, and lifted again (608). Operation 608 can be performed at least partially after operation 606, as described for operation 606 with respect to operation 604. The lowering in operation 608 can be, for example, to the initial vertical level of the first set when operation 604 was initiated (e.g., to the floor surface, or another level as described with respect to operation 602). However, the lowering is not limited thereto, and can be performed to another predetermined vertical level. In some implementations, the lowering includes movement of the first set of wedge blocks 132 in the backward direction, e.g., to an initial forward/backward position before the first set of wedge blocks 132 were moved forward in operation 604. The movement forward and lifting in operation 608 can be performed as described for operation 604.

Continuing in reference to FIG. 6, optionally, the second set of wedge blocks 132 is lowered, moved forward again, and lifted again (610). Operation 610 can be performed at least partially after operation 608, as described for operation 606 with respect to operation 604. The lowering in operation 608 can be, for example, to the initial vertical level of the second set when operation 606 was initiated (e.g., to the floor surface, or another level as described with respect to operation 602). However, the lowering is not limited thereto, and can be performed to another predetermined vertical level. In some implementations, the lowering includes movement of the second set of wedge blocks 132 in the backward direction, e.g., to an initial forward/backward position before the second set of wedge blocks 132 were moved forward in operation 606. The movement forward and lifting in operation 610 can be performed as described for operation 606.

Operations 608 and 610 can optionally repeat until an end condition is met (612). For example, operations 608 and 610 can repeat until the robotic system 100 has moved a predetermined distance forward or has reached a target position.

Optionally, when the end condition is met, lifting of the item continues by lifting with both the first set and the second set of wedge blocks 132 simultaneously (614), or by stopping lifting operations, e.g., switching to a mode in which unloading is performed by moving the robotic system 100 forward without separately lifting the wedge blocks 132.

In some implementations, operations 604, 606, 608, and 610 are performed repeatedly while the robotic system 100 moves forward in a trailer or container, e.g., until the robotic system 100 satisfies a position condition, for example, advances a predetermined amount or reaches the end of the trailer or container. As the robotic system 100 moves forward, the process 600 promotes damage-free lifting of goods, and the movement of the robotic system 100 and separate movement of the wedge blocks 132 promotes transfer of goods onto conveyer belts 142. In some implementations, the robotic system 100 moves forward at a speed between 0.05 meters/second and 0.2 meters/second, e.g., while performing the process 600.

It will be understood that the process 600 is not restricted to use with wedge blocks and robotic systems having any of the particular structures described herein but, rather, can generally be applied to robotic systems having forward-extending lifting members (e.g., paddles, tine, forks, wedges, platforms, etc.) that can lift and transfer items, and example of which is the wedge blocks discussed herein.

Figure 4:
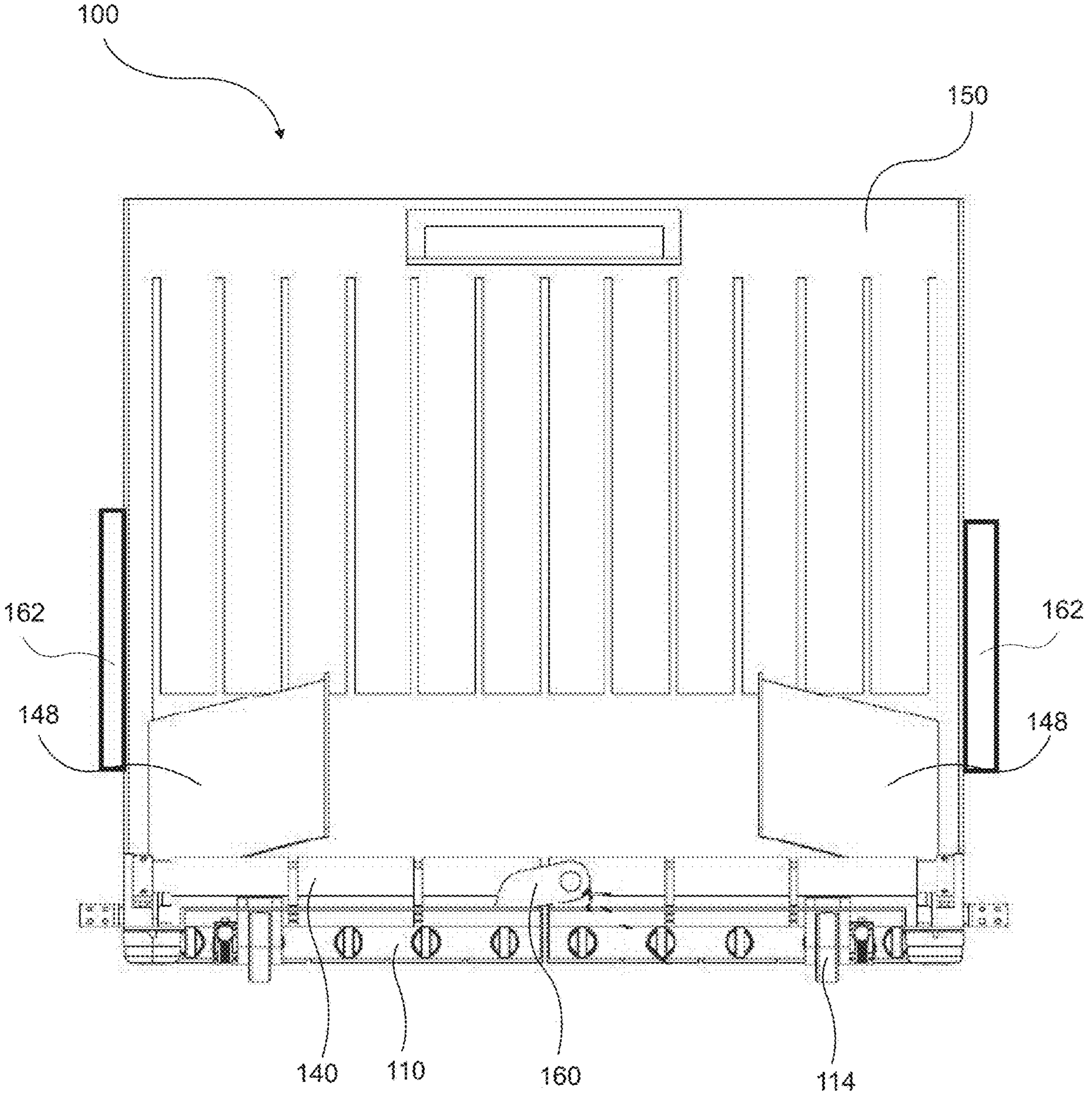
FIG. 4 is a rear view of the robotic system of FIG. 1.
Figure 5:
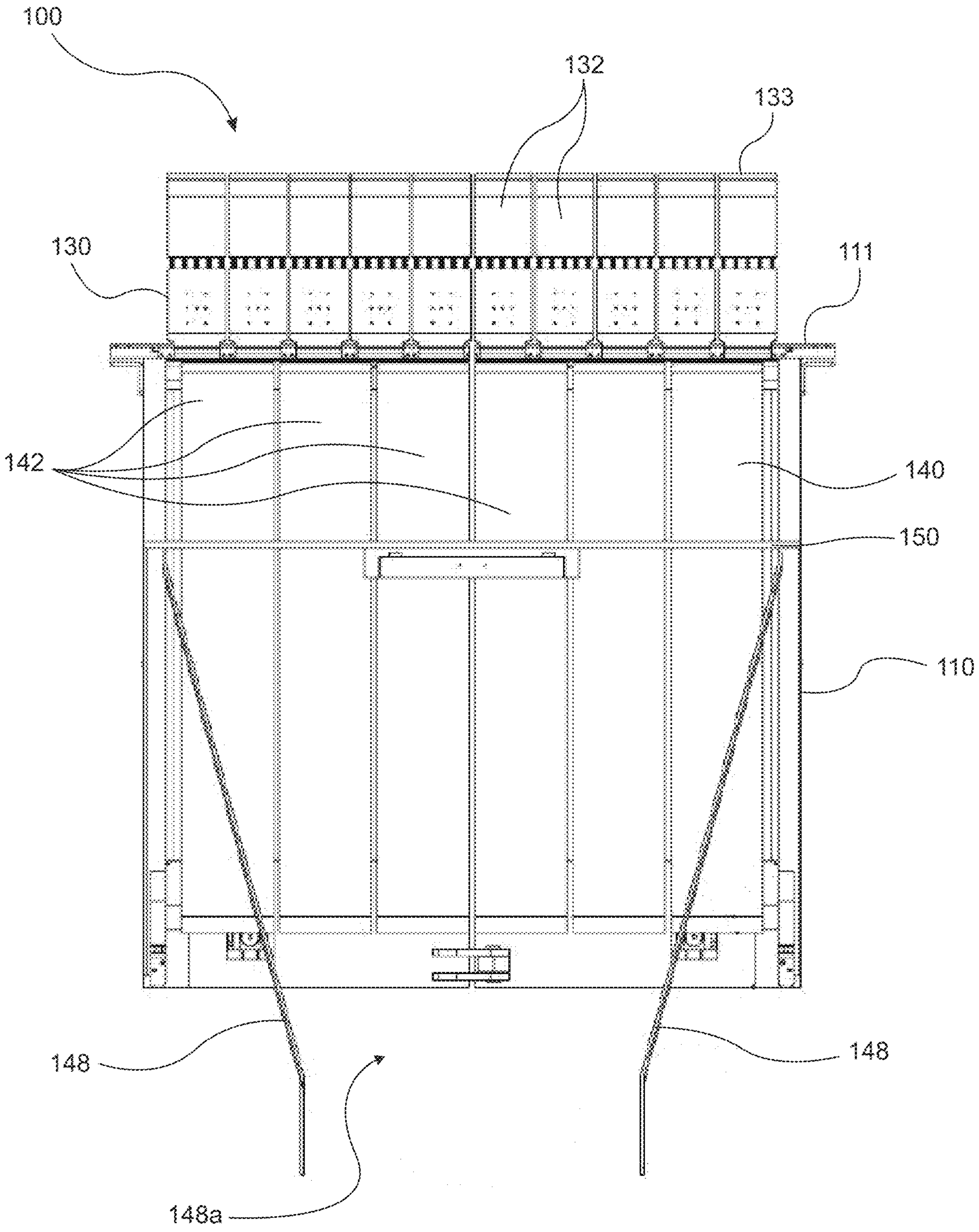
FIG. 5 is a top view of the robotic system of FIG. 1.

Referring to FIGS. 1, 4 and 5, in some implementations, the robotic system 100 includes a conveyor assembly 140. The conveyor assembly 140 may be provided on a top face of the mobile base assembly 110. In some implementations, as shown in FIGS. 4 and 5, the conveyor assembly 140 includes a plurality of conveyor belts 142, each of which run across the top face of the mobile base assembly 110, over a pair of rollers adapted to be rotated independently by a corresponding motor. The conveyer belts 142 can extend along a forward/backward direction of the robotic system 100. The plurality of conveyor belts 142 and the conveyor assembly 140 are configured to move any goods/items placed thereon and guide the goods/items outside the container towards the rear side of the robotic system 100. For example, the plurality of conveyer belts 142 can be configured and controlled to carry items away from the lifting assembly 130. Movement of the conveyer belts 142 can be performed based on signals/commands provided by the computing device 170. In some implementations, the conveyer belts 142 can be run independently in forward or backward directions.

In some implementations, each conveyor belt 142 of the plurality of conveyor belts 142 is driven individually, by a respective drive motor. The plurality of conveyor belts 142 may be adapted (e.g., shaped, arranged, and/or controlled) to converge the unloaded goods from a width of the container to a narrower conveyor assembly at the rear side of the robotic system 100. The convergence of the goods may be achieved by operating the conveyor belts 142 at variable speeds compared to each other. For example, outer conveyer belt(s) 142 can be operated more slowly than inner conveyer belt(s) 142. In some implementations, referring to FIG. 5, a set of barriers 148 (e.g., guide plates 148), forming a funnel-type mechanism 148*a*, are arranged to cause goods to move from being arranged across the width of the container at the lifting assembly 130 to being arranged across a narrower conveyor assembly at the rear side of the robotic system 100 (bottom of FIG. 5).

Based on their independent control in some implementations, the conveyer belts 142 can provide targeted transfer, e.g., can, for example, be operated selectively to transfer one item at a time from the robot. For example, a first of the conveyer belts 142, on which a first item is arranged, can transfer the item backwards, while a second of the conveyer belts 142, on which a second item is arranged, can temporarily not operate. After the first item has been transferred rearward of the robotic system 100, the second conveyer belt can be operated to transfer the second item. Accordingly, items can be singulated.

In some implementations, the computing device 170 receives data from one or more of the sensors indicative of locations of items on the wedge blocks 132 and/or the conveyer belts 142. Alternatively, or in addition, the computing device 170 can receive data from one or more sensors integrated with the conveyer assembly 140 to detect a jam condition. For example, the computing device 170 can receive data from limit switch(es), camera(s), IMU(s), and/or bumper(s). Based on the data, the computing device 170 can identify a jam condition (i) predictive of a current jam between multiple items and/or (ii) predictive of a possible jam between multiple items, e.g., should the items be moved rearward simultaneously. Identification of the jam condition can be based on at least one of sizes of the items, relative locations of the items, a detected number of items or shapes of the items, to provide several non-exhaustive examples. In some implementations, the computing device 170 determines a number of items being transferred from the conveyor assembly 140 rearward. If the number or a rate of such items is below a threshold number or rate, the computing device 170 can infer that a jam is present (identify a jam condition). As another example, in some implementations, the computing device 170 receives sensor data indicative of a position of an item on the conveyor assembly 140, e.g., from a proximity sensor or camera. If the item does not move or moves sufficiently slowly over a period of time, the computing device 170 can identify a jam condition.

In some implementations, based on identifying the jam condition, the computing device 170 operates the conveyer belts 142 selectively to alleviate the jam condition. For example, one or more of the conveyer belts 142 can be operated in reverse (transferring item(s) forward) to clear a jam condition. As another example, the conveyer belts 142 can be operated one-by-one or otherwise only partially, to transfer the items without causing a jam.

Figure 9:
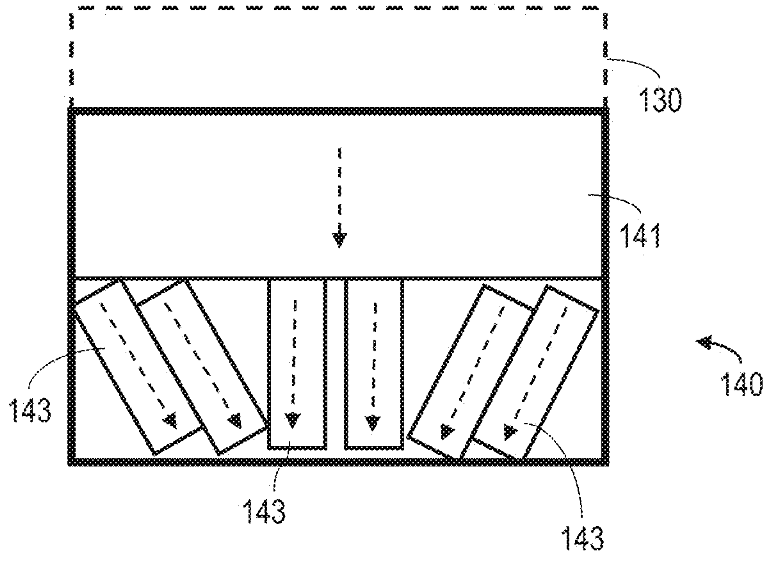
FIG. 9 is a top view of an example of a conveyor assembly.

Various arrangements of multiple conveyer belts 142 are within the scope of this disclosure. For example, in some implementations, as shown in FIG. 9, the conveyor assembly 140 includes a wide conveyer belt 141 adjacent to the lifting assembly 130, the wide conveyer belt 141 extending across most or all of a width of the robotic system 100. The conveyor assembly 140 can further include, rearward of the wide conveyer belt 141, multiple narrower conveyer belts 143 arranged to receive items from the wide conveyer belt 141. The narrower conveyer belts 143 can be arranged side-by-side across a width of the robotic system 100 and can be (though need not be) arranged at multiple angles.

Figure 11:
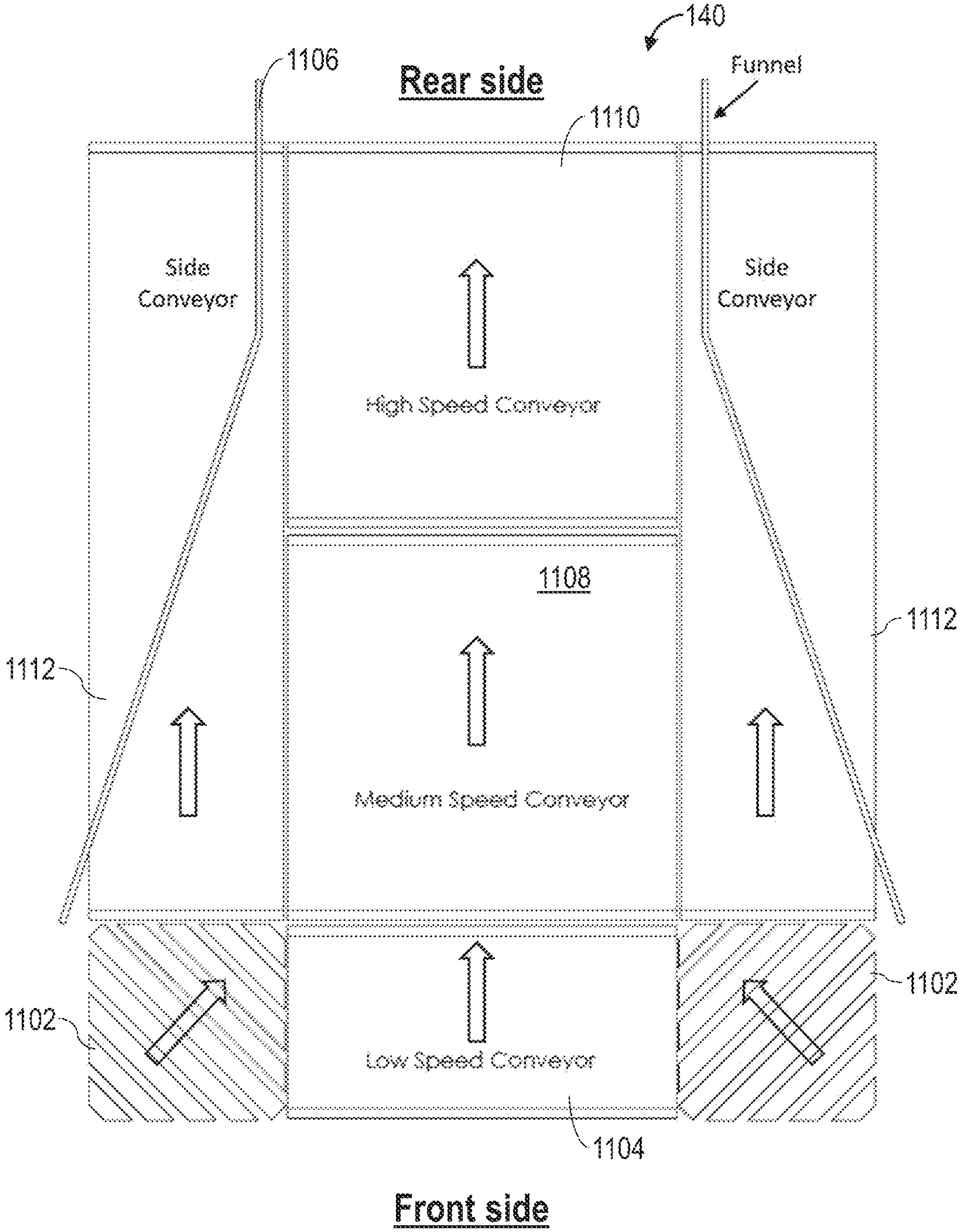
FIG. 11 is a top view of an example of a conveyor assembly.

FIG. 11 illustrates another example of a conveyer assembly 140 including multiple conveyer belts. In this example, the conveyer assembly 140 includes, adjacent to the lifting assembly at the front side of the conveyor assembly 140, inwardly-directed conveyer belts 1102 that transfer items from the lateral edges towards a middle of the conveyor assembly 140. Other conveyer belts are directed rearward with various speeds as shown in FIG. 11. A low-speed conveyer belt 1104 is arranged at the front side between the inwardly-directed conveyer belts 1102. Medium-speed and high-speed conveyer belts 1108, 1110 are arranged serially rearward of the low-speed conveyer belt 1104. Side conveyer belts 1112 are arranged on opposite lateral sides of the conveyer belts 1108, 1110. A funnel 1106 (e.g., a wall/barrier) directs items towards the lateral middle of the conveyor assembly 140 for transfer further rearward.

In some implementations, the conveyer assembly 140 includes sloped conveyer belts. The sloped conveyer belts can transfer items from near ground level to customer conveyer belts (not illustrated) that receive unloaded items from the robotic system. These customer conveyer belts may be arranged at about a meter from ground level. As such, sloped conveyer belts can transfer items upward to the level of these elevated customer conveyer belts.

Figure 12:
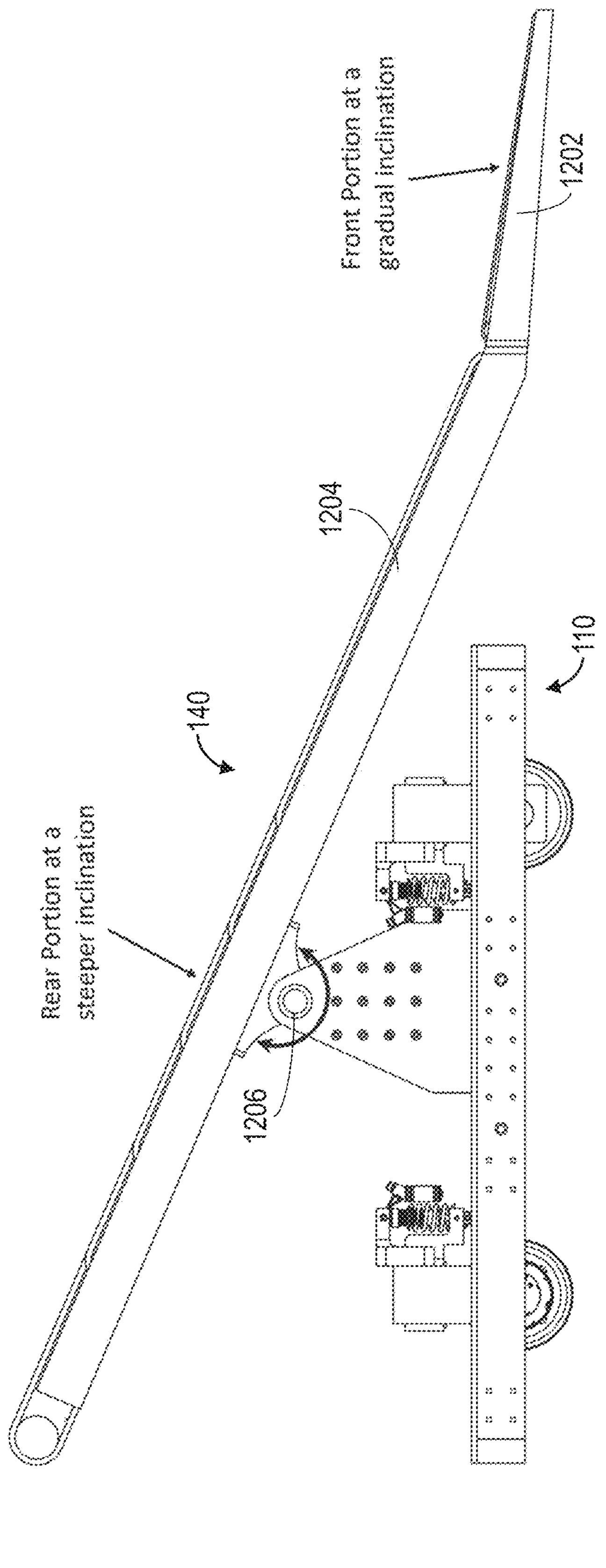
FIGS. 12-13 are side views of examples of conveyor assemblies.

For example, as shown in FIG. 12, in some implementations, different conveyer belts of the conveyor assembly 140 have different inclinations. In an example of the conveyor assembly 140, one or more front conveyer belts 1202 have a gradual upward inclination, and one or more rear conveyer belts 1204 have a steeper upward inclination. For example, the front conveyer belts 1202 can be the inwardly-directed conveyer belts 1102 and the low-speed conveyer belt 1104, and the rear conveyer belts 1204 can be the medium-speed, high-speed, and side conveyer belts 1108, 1110, 1112. For clarity, the lifting assembly is not shown in FIG. 12. The angular orientation of the front conveyer belts 1202 with respect to the rear conveyer belts 1204 can be fixed or controllable (e.g., by the computing device 170 using any suitable actuator), in various implementations.

In some implementations, the conveyer assembly 140 is controllably tiltable/rotatable. This rotation can permit the lifting assembly 130 to be raised off the ground (e.g., to 100-200 mm off the ground) when the robotic assembly 100 is navigating up a ramp, e.g., to enter a container from which good are being unloaded. The lifting assembly 130 is raised so as to not impede forward movement of the robotic system.

In the example of FIG. 12, the robotic system 100 includes an actuator 1206 that can be controllably rotated (e.g., by the computing device 170) to rotate the conveyer assembly 140. The actuator 1206 can include any one or more suitable actuators, e.g., a spring-loaded actuator, an electrical actuator, a pneumatic actuator, or a hydraulic actuator. The rotation can be about a lateral axis, e.g., an axis parallel to the axis about which the actuator 134 causes the wedge blocks 132 to rotate. The axis of rotation of the conveyer assembly 140 can be arranged approximately at a center of the weight distribution of the conveyer assembly 140 along the forward-backward direction, e.g., within 10% or 20% of a length of the conveyer assembly 140 from the center. This arrangement can reduce torque requirements for the actuator 1206.

Figure 13:
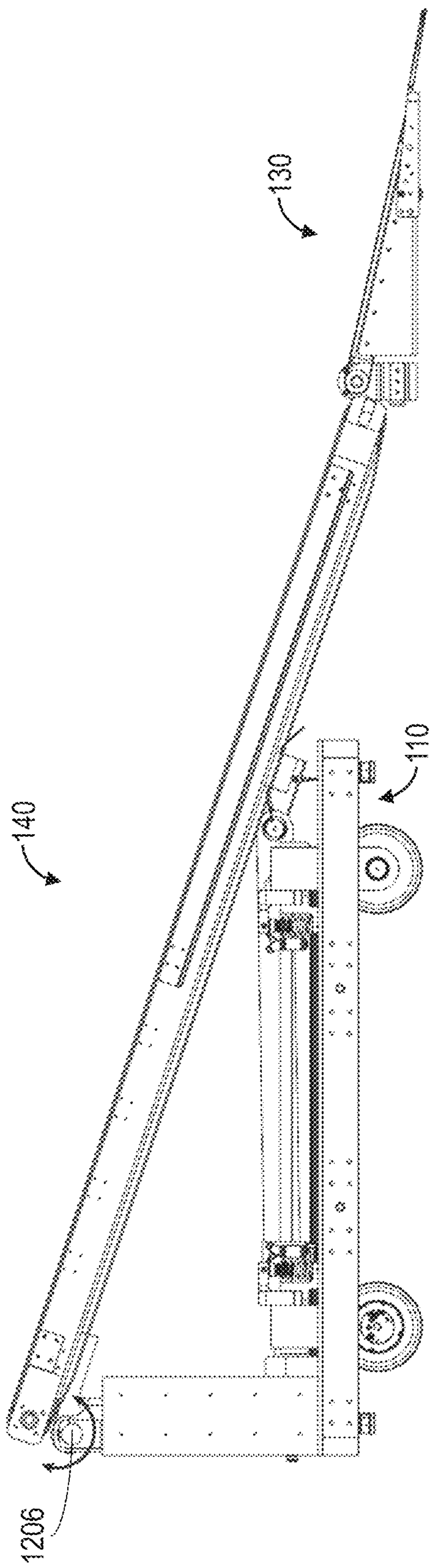

As another example, in some implementations, as shown in FIG. 13, the actuator 1206 can be arranged at or adjacent to a rear of the conveyor assembly 140.

The robotic system 100 need not include multiple conveyer belts 142. For example, in some implementations, one conveyer belt 142 is included, e.g., a conveyer belt 142 stretching across all or most of a width of the robotic system 100.

In some implementations, the conveyer belts 142 are arranged, and the wedge blocks 132 are configured, such that items lifted up by the wedge blocks 132 fall, shift, or slide onto the conveyer belts 142. Accordingly, in some implementations, no manual work or additional mechanisms are necessary to move goods from the front of the robotic system 100 (where the goods are lifted and transferred by the lifting assembly 130) to the rear of the robotic system 100 (to which the goods are transferred by the conveyer belts 142), and the robotic system 100 can unload with high throughput and minimal or no intervention. For example, in some implementations, a distance between a forward edge of the conveyer belts 142 is within 3 mm, 5 mm, or 10 mm of the hinge axis X-X' about which the wedge blocks rotate, to allow lifted goods to fall or slip immediately onto the conveyer belts 142. In some implementations, the wedge blocks 132 are configured to rotate to an angle of at least 20°, at least 30°, or at least 40° above a level plane (e.g., with respect to a floor surface on which the robotic system 100 moves), to promote falling or slipping of lifted goods away from the front edge 133 toward the conveyer belts 142.

In some implementations, the robotic system 100 includes a horizontal conveyor belt (not shown), telescopic conveyor (not shown), and/or an incline conveyor belt (not shown) provided at the rear side of the mobile base assembly 110 and downstream of the conveyor assembly 140, so as to transfer the goods unloaded from the container. The horizontal conveyor belt or the incline conveyor belt may be driven by a respective motor.

Figure 7:
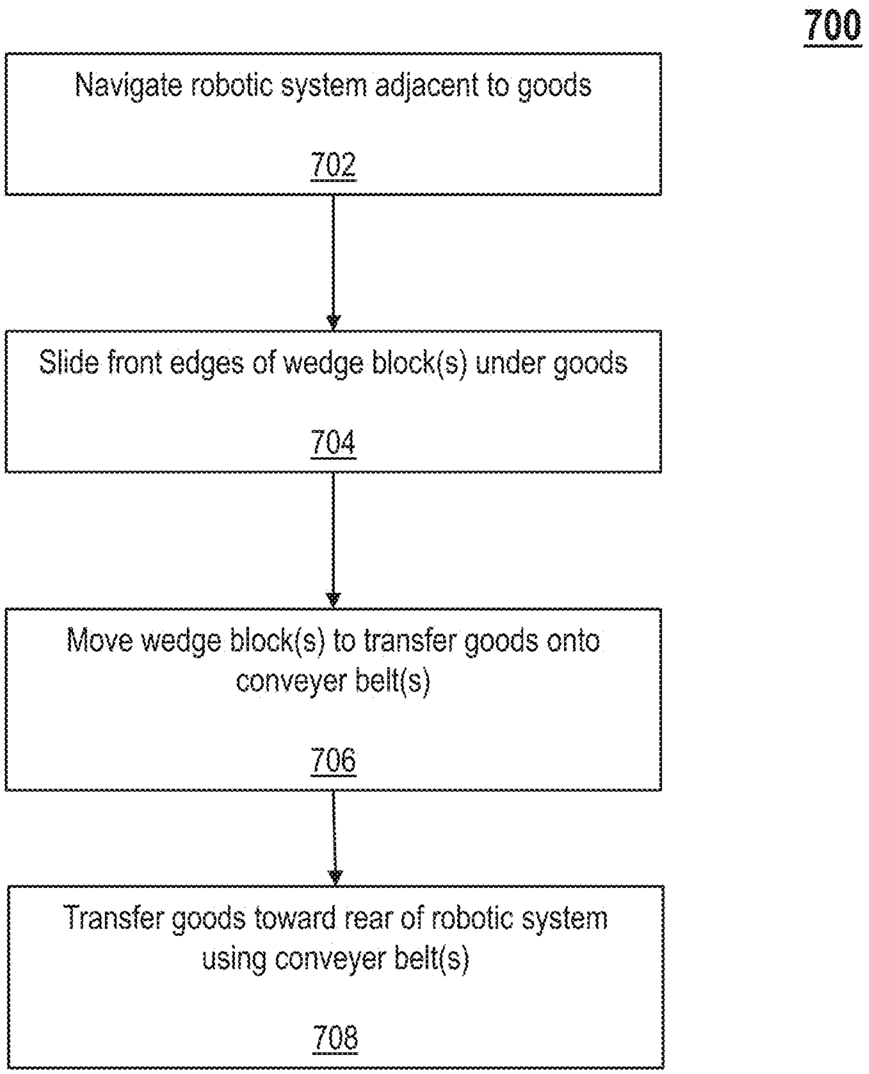
FIG. 7 is a diagram illustrating an example of an unloading method.

According to a non-limiting working example of the robotic system 100, as shown in FIG. 7, a process 700 including navigating the robotic system 100 adjacent to goods (702), e.g., such that the goods 702 are in proximity to a front side of the robotic system 100, where the lifting assembly 130 is located. The robotic system 100 can be navigated using the mobile base assembly 110. For example, one or more sensors of the robotic system 100 can detect the presence of goods at a location, and the robotic system 100 can be moved adjacent to the location using the mobile base assembly 110.

Front edges 133 of one or more wedge blocks 132 of the robotic system 100 are slid under the goods (704). Operation 704 can include controlled movement of individual wedge blocks 132 and/or control of the robotic system 100 as a whole (e.g., using the mobile base assembly 110 to move the robotic system 100 forward). The goods may be a single item or a pile (e.g., stack) of items, such as a stack of boxes. For example, the front edges 133 can be slid under the bottom-most goods of a first pile of goods in front of the robotic system 100. During operation 704, the wedge blocks 132 can be tilted downward (e.g., be oriented at a negative angle with respect to a level plane), for example, based on control using the actuator 134.

The wedge blocks 132 are moved to transfer the goods from the wedge blocks 132 onto the conveyer belts 142 (706). In some implementations, operation 706 includes moving the robotic system 100 (including the wedge blocks 132) forward, such that the wedge blocks 132 slide further under the goods, the goods slide up on the wedge blocks 132 based on the wedge shape of the wedge blocks 132, and the goods slide onto the conveyer belts 142. That is, operation 706 need not include controlled movement of the wedge blocks 132 independent of the robotic system 100 as a whole. Instead, or additionally, operation 706 can include lifting movement by the wedge blocks 132, e.g., upward rotation of the wedge blocks 132 and/or vertical lifting by the wedge blocks 132. This movement can cause the goods to slide or fall onto the conveyer belts 142. In some cases, an entire stack of goods can be transferred onto the conveyer belt in a single sliding (704) and moving (706) process, providing high unloading throughput.

In some implementations, operations 704 and/or 706 include the process 600.

In some implementations, operation 705 includes lifting the wedge blocks 132 to a target height, and then controlling the wedge blocks to transfer the goods rearward onto the conveyer belts 142. Controlling the wedge blocks 132 can include rotating the wedge blocks 132 (e.g., rotating the tips of the wedge blocks 132 up so that the goods slide rearward) and/or controlling the optional conveyer(s) that may be included on top sides of the wedge blocks 132, as described above.

Continuing in reference to FIG. 7, the conveyer belts 142 are controlled to transfer the goods toward a rear of the robotic system 100 (708), e.g., toward an entrance of the container or out of the container. In some implementations, a speed of the conveyor belts 142 is adjusted to control the outflow of goods. In some implementations, a rear height of the conveyor assembly 140 is adjusted to match the height of a horizontal, telescopic, or inclined conveyor disposed downstream of the conveyor assembly 140.

Process 700 can be performed entirely or substantially continuously, e.g., with the robotic system 100 continuing to move forward into a container, slide the wedge blocks 132 under encountered goods, and transfer the goods onto the conveyer belts 142 and rearward.

Referring to FIGS. 1, 4, 5, and 8, in some implementations, the robotic system 100 includes a blocking assembly 150 arranged over the mobile base assembly 110 and/or the conveyor assembly 140. For example, the blocking assembly 150 may be provided above the conveyor assembly 140 and rearwardly of the lifting assembly 130. The blocking assembly 150 may be made of rigid material or flexible material. Also, the blocking assembly 150 may be made as a single piece unit, or as an array of different segments arranged to form a single wall-like barrier. The wall-like barrier extends across at least a portion of a width of the robotic system 100 and extends vertically, such that goods collide with the barrier while being moved backward by the conveyor assembly 140 and/or while being moved or falling toward the conveyer assembly.

Figure 8:
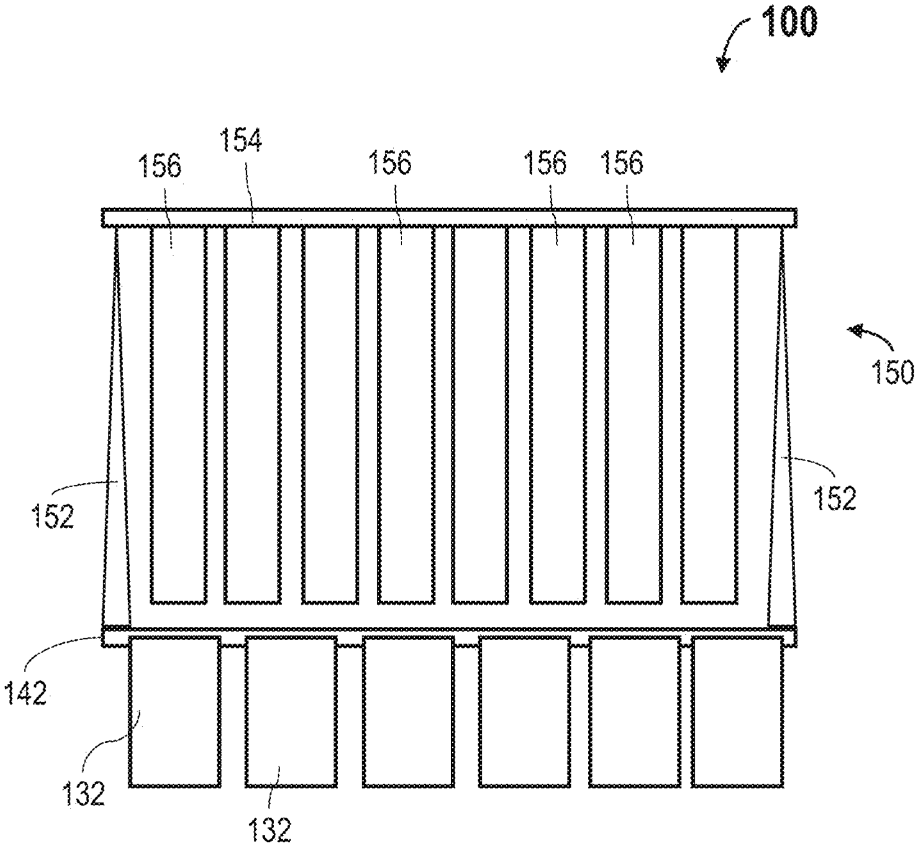
FIG. 8 is a diagrammatic front view of the robotic system of FIG. 1.

FIG. 8 illustrates the robotic system 100 in a front view. As shown in FIG. 8, the blocking assembly 150 can include an array of strip curtains 156 (sometimes referred to as “dock curtains”). The strip curtains 156, which are flexible, hang downward from a suspension arm 154 arranged above the mobile base assembly 110 and/or the conveyor assembly 140. The suspension arm 154 is supported by one or more supports 152. The array of strip curtains 156 extends laterally across at least a portion of a width of the robotic system 100. The strip curtains 156 can be composed of plastic, e.g., polyvinyl chloride (PVC). The hanging strip curtains 156 form a loose barrier. It will be understood that the blocking assembly 150 is not limited to being composed of strip curtains but, rather, that various other materials and structures can provide a suitable barrier. In some implementations, the blocking assembly has a width and/or a height in a range from 200 cm to 250 cm.

The blocking assembly 150 is configured to restrict or resist movement of at least some goods being transferred. For example, the blocking assembly 150 can be configured to restrict or resist movement of at least goods positioned above bottom-most goods in a pile of goods. It is typical that such piles of goods may fall/collapse during unloading, for example, while being lifted/moved using the wedge blocks 132 and/or while being moved using the conveyer belts 142. Absent a mechanism to arrest the movement of high-up goods, higher-up goods may be damaged by falling. The blocking assembly 150 presents a barrier with which goods will collide during transfer, slowing down the goods’ fall and providing a more gradual unloading of goods arranged as a pile of goods. For example, from a pile of goods, the bottom-most goods may cross the blocking assembly 150 and be transferred by the conveyor assembly 140 (with the blocking assembly 150 restricting their movement only slightly or not at all). Higher-up goods may fall relatively slowly based on contact with the barrier, and, upon falling onto the conveyer assembly, be transferred rearward in turn.

In some implementations, the blocking assembly 150 is a controllable rigid or semi-rigid structure that can be controlled (e.g., by the computing device 170) to move vertically. For example, the blocking assembly 150 can have a “garage door”-like structure that can be raised and lowered like a shutter. The computing device 170 can raise and lower the blocking assembly 150 to permit flow of items below the shutter in a controlled manner.

In some implementations, the computing device 170 can use data from sensors (e.g., cameras) to determine a height of a top of an item being handled and, based on the height, determine a target height of a lower edge of the shutter (or other blocking element of the blocking assembly 150) to permit passage of the item. Accordingly, for example, for a stack of items, the lowest item in the stack can be transferred while higher items are selectively blocked. When the lowest item has been transferred past the blocking assembly 150, the next-lowest item will fall onto the conveyer assembly 140 (in some cases, slowed by the blocking assembly 150 to reduce damage) and can then be transferred in turn, e.g., in some cases with additional movement of the blocking assembly 150.

In some implementations, the blocking assembly 150 includes a suspension system, e.g., springs. In some implementations, the blocking assembly 150 includes a vertical conveyer belt on a forward-facing side of the blocking assembly 150. The vertical conveyer belt can be controlled to move downwards, such that items in contact with the conveyer belt (e.g., elevated items in a stack of items) are moved down by the conveyer belt. The conveyer belt can act to regulate (e.g., reduce) the speed with which the items move down, e.g., to reduce or prevent damage to the items that might occur if the items fell down in an uncontrolled manner.

Referring to FIG. 4, in some implementations, the robotic system 100 includes a hinge 160 provided on a chassis of the mobile base assembly 110. The hinge 160 facilitates folding part of the robotic system 100 at a hinge joint of the hinge 160. The folding of the robotic system 100 offers sufficient walking space for manual operators to enter the container for maintenance, inspection or other purposes. The action of folding the robotic system 100 may be performed at the hinge joint by manual operators or electrical or hydraulic actuators.

In some implementations, one or both lateral sides of the robotic system 100 include a suspension system 162. The suspension system 162 can include spring-loaded members (e.g., soft members, such as foam members) that can extend to contact walls of an enclosure (e.g., trailer/container) in which the robotic system 100 navigates. Based on the springs, the members can move outwards and contract based on forces applied between the walls and the members. Accordingly, the robot can navigate seamlessly along the walls without colliding harmfully with the walls. In some implementations, a contact or pressure sensor integrated with the suspension system can detect compression of the suspension system to alert the computing device 170 that the robotic system 100 is pressing against a wall on a particular lateral side. In response, the computing device 170 can control the robotic system 100 to move away from the wall.

In some implementations, the robotic system 100 includes a computing device 170 (shown only schematically in FIG. 1) including a data processor and a memory storing non-transitory computer-readable instructions which can be executed by the data processor. The computing device 170 may include one or more controllers and a communication interface. The computing device 170 may be coupled to a power supply located in the mobile base assembly 110 or elsewhere, such as the battery. The power supply may be coupled to one or more sensors and to one or more actuators. The one or more sensors may transmit sensor data to the computing device 170. The computing device 170 may be connected (e.g., electrically and/or communicatively connected) to sensors, actuators, and/or motors. The computing device 170 can receive sensor data from the sensors. The computing device 170 can control movement of the motors and/or actuators. For example, the actuators may include the first drive motor 116, the second drive motor 118, the actuator 134, actuators 137, actuator 1206, and/or the spring-loaded retracting mechanism 136. These and/or other actuators may be coupled to the computing device 170 and may receive control commands from the computing device 170.

In some implementations, at least one of the first drive motor 116, the second drive motor 118, the actuator 134, actuator 1206, and actuators 137 may be configured with a low gear ratio and coupled to a corresponding controller of the controllers. Each motor can be individually controlled via the corresponding controller to actuate according to a control command provided from the computing device. The one or more controllers may include a current controller, a force controller, and/or a position controller. The current controller can be configured to generate actuation signals in response to input signals received from the force controller. The actuation signals can be provided to the first drive motor 116, the second drive motor 118, the actuator 134, and/or the actuators 137. The force controller can receive inputs associated with a measured interaction force (Fi), a maximum interaction force (Fm), and a desired/objective output force (Fo). The position controller can be configured to output the desired or objective output force (Fo) based on inputs of measured and desired/objective position/location data associated with a position/location of the vertical gantry structure and/or the mobile base assembly.

The first drive motor 116, the second drive motor 118, the actuator 134, the actuator 1206, and/or the actuators 137 may include closed loop current feedback control for actuation of the first and second drive wheels 112, 114 and the wedge blocks 132. Stepper motors, brushed DC (direct current) motors or brushless direct current (BLDC) motors can be configured to generate high torque at low speeds, allowing lower gear ratio transmissions or gear trains to be used. The robotic system 100 may control coil current of the first drive motor 116, the second drive motor 118, the actuator 134, actuator 1206, and/or the actuators 137 based on feedback associated with a rotor position of the corresponding motor. The rotor position can be measured via an Optical encoder, or a Hall effect sensor and a magnet mounted to the motor. The closed loop current feedback control allows instantaneous actuator current to be determined. In some implementations, the closed loop current feedback control is implemented by a position and/or velocity control loop of the motor using a proportional-integral-derivative (PID) control loop mechanism.

In some implementations, the computing device 170 is a first computing device coupled to a second computing device 180 via a network. The second computing device 180 may be located remotely from the robotic system 100. In some implementations, as shown in FIG. 1, the robotic system 100 includes the second computing device 180, which may include a data processor, a memory storing non-transitory computer-readable instructions, a communication interface, an input device and a display including a graphical user interface. The second computing device 180 may be configured to receive user inputs and to generate control commands to control the robotic system 100 to perform a task, to navigate an environment, or to transmit sensor data to the second computing device. The second computing device 180 may receive the user input via the input device and/or the GUI. The user inputs can be processed and transmitted via the communication interface to the communication interface of the first computing device 170. The communication interfaces may be wired communication interfaces and/or wireless communication interfaces. Once received, the robotic system 100 may be configured to generate an actuation signal responsive to the user input causing the robotic system 100 to perform one or more operations. In some implementations, the input device includes a joystick, a keyboard, a mouse, or a touchscreen. The second computing device 180 can be configured to perform any of the control, sensing, processing, etc., operations described above for the first computing device 170, such that the robotic system can partially or entirely remote-controlled.

In accordance with some implementations of the present disclosure, the design of thin front-edged wedge blocks 132 of the lifting assembly 130 may work with or without slip-sheets placed below goods. Such slip sheets may be required for some conventionally-known unloading systems. Also, in some implementations, the design of the wedge blocks 132 makes unloading operations independent of the type, size, or shape of goods or orientation of the goods inside the container. The goods may include, but not limited to, tires, jute bags, cement bags, pouches, bottles, carton boxes, stacked or shrink-wrapped goods, pallets, etc., any of which may be lifted using the wedge blocks 132 and transferred to the conveyer belts 142. In some implementations, the retraction mechanism 136 of individual wedge block 132 allows the robotic system 100 to work even in the presence of protruding elements or obstacles on the floor of the container.

Further, the conveyor assembly 140 provided behind the wedge blocks 132 facilitates continuous operation of unloading the goods from the container.

Moreover, in some implementations, once the robotic system 100 aligns with a container, the robotic system 100 can enter the container at a constant or near-constant speed and unload goods automatically and gradually. For example, in some implementations, the robotic system 100 need not (though may) implement any sensors to locate any goods, or to locate positions of specific goods, inside the container before unloading. For example, once aligned with a container, the robotic system 100 can move continuously forward (e.g., optionally while performing operations 606, 608 repeatedly) to continuously unload goods. In some implementations, the robotic system 100 does not require any modifications to be made to trailers or the way goods are placed inside the container, and thus does not necessitate placing the goods on a slip sheet, a belt that can be pulled, or on a conveyor belt system inside the container as required for some conventional robots.

Additionally, since the robotic system 100 of the present disclosure may work with or without gripping goods for unloading operations, the robotic system 100 need not (though may) include any robotic manipulator, pneumatic or mechanical grippers.

As noted above, the wedge blocks 132 of the robotic system 100 may include an inflatable section which is inflated once the wedge blocks 132 are placed and slid under the bottom-most goods of a pile of goods. The inflated section lifts the goods and makes it easier for the rest of the wedge blocks 132 to slide below the goods.

The provision of folding the robotic system 100 (e.g., using hinge 160) can facilitate providing access to manual operators to enter inside the container in case the robotic system 100 fails to operate. Once the manual operator resolves the issue, they can unfold the robotic system 100, and the robotic system 100 will continue the unloading operation.

Various examples according to the present disclosure have been described above with reference to the accompanying drawings. However, the scope of the present disclosure is not limited to the illustrated examples. It will be understood that various modifications and combinations can be made without departing from the scope of this disclosure. For example, although robotic systems have been described as including assemblies (e.g., a mobile base assembly, a conveyer assembly, and a lifting assembly), implementations according to the present disclosure can include any one or more of those assemblies. Moreover, the assemblies themselves, and the described components of the assemblies, can represent contributions of the present disclosure, e.g., without necessarily being included in a robotic system or assembly as described in some examples above.

Herein, the terms "attached", "connected", "interconnected", "contacting", "mounted", "coupled" and the like can mean either direct or indirect attachment or contact between elements, unless stated otherwise.

While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

What is claimed is:

1. A robotic system comprising:

a mobile base assembly configured to maneuver the robotic system about a floor surface; a lifting assembly at a front side of the robotic system, wherein the lifting assembly comprises a plurality of wedge blocks arranged along a lateral direction, each wedge block of the plurality of wedge blocks having a substantially planar top surface that is inclined downward, such that the wedge block has a thickness that tapers toward a thin front edge of the wedge block;

one or more conveyer belts rearward of the lifting assembly, wherein the one or more conveyer belts are configured to receive an item lifted by one or more wedge blocks of the plurality of wedge blocks and move the item toward a rear side of the robotic system; and an actuator configured to pivot a first wedge block of the plurality of wedge blocks about a lateral axis independently of other wedge blocks of the plurality of wedge blocks.

2. The robotic system of claim 1, comprising at least one actuator configured to translate at least one wedge block of the plurality of wedge blocks, with respect to other wedge blocks of the plurality of wedge blocks, laterally or along a forward/reverse direction.

3. The robotic system of claim 1, wherein each wedge block of the plurality of wedge blocks comprises a spring-loaded retracting mechanism, the spring-loaded retraction mechanism configured to retract a front portion of the wedge block toward a rear portion of the wedge block.

4. The robotic system of claim 1, comprising a computing device configured to:

receive sensor data indicative of a position of one or more items on the one or more conveyer belts;

based on the position of the one or more items, identify a jam condition; and based on identifying the jam condition, control the one or more conveyer belts to relieve the jam condition.

5. The robotic system of claim 1, wherein each wedge block of the plurality of wedge blocks is configured to pivot independently about the lateral axis.

6. The robotic system of claim 1, comprising a computing device configured to control the robotic system to:

slide the one or more wedge blocks of the plurality of wedge blocks under the item; and lift the item using the one or more wedge blocks, to cause the item to be transferred onto the one or more conveyer belts.

7. The robotic system of claim 6, wherein lifting the item using the one or more wedge blocks comprises using the mobile base assembly to move the robotic system forward, such that the item slides up on the one or more wedge blocks.

8. The robotic system of claim 6, wherein lifting the item using the one or more wedge blocks comprising moving the one or more wedge blocks independently of the mobile base assembly.

9. The robotic system of claim 8, wherein moving the one or more wedge blocks comprises rotating the one or more wedge blocks up about the lateral axis.

10. The robotic system of claim 1, comprising a barrier arranged over the mobile base assembly and rearward of the lifting assembly, wherein the barrier is configured to restrict movement of goods positioned over bottom-most goods in a pile of goods lifted by the one or more wedge blocks.

11. The robotic system of claim 10, wherein the barrier comprises at least one flexible hanging member.

12. The robotic system of claim 10, wherein the barrier is configured to controllably raise and lower.

13. The robotic system of claim 1, comprising at least one barrier configured to funnel goods arranged across a width of the lifting assembly, to cause the goods to be arranged across a narrower width at the rear side of the robotic system.

14. The robotic system of claim 1, wherein at least one wedge block of the plurality of wedge blocks comprises an inflatable section configured to lift the item by inflating.

15. The robotic system of claim 1, wherein each wedge block of the plurality of wedge blocks has a length in a range from 150 mm to 250 mm.

16. The robotic system of claim 1, wherein each wedge block of the plurality of wedge blocks has a width less than 100 mm.

17. The robotic system of claim 1, comprising a suspension system arranged at a lateral side of the robotic system to contact walls.

18. The robotic system of claim 1, wherein adjacent wedge blocks of the plurality of wedge blocks are separated from one another by a distance in a range from 3 mm to 7 mm.

19. The robotic system of claim 1, wherein each wedge block of the plurality of wedge blocks comprises a low-friction material at a front portion of the wedge block.

20. The robotic system of claim 1, wherein the plurality of wedge blocks comprise a first set of one or more wedge blocks and a second set of one or more wedge blocks, and wherein the robotic system comprises a computing device configured to control the robotic system to, in order:

(i) move the first set forward and up;

(ii) move the second set forward and up;

(iii) lower the first set; and (iv) move the first set forward and up.

21. The robotic system of claim 20, wherein lowering the first set comprises lowering the first set to contact the floor surface.

22. The robotic system of claim 20, wherein the computing device is configured to control the robotic system to, after (iv):

(v) lower the second set;

(vi) move the second set forward and up; and continue repeating (iii)-(vi) while moving the robotic system forward using the mobile base assembly.

23. The robotic system of claim 20, wherein moving the first set forward and up comprises moving the first set forward by between 1 mm and 10 mm.

24. The robotic system of claim 20, wherein the first set of one or more wedge blocks and the second set of one or more wedge blocks alternate with one another along the lateral direction.

25. A method of controlling the robotic system of claim 1, wherein the plurality of wedge blocks of the robotic system comprises a first set of one or more wedge blocks and a second set of one or more wedge blocks, and wherein the method comprises, in order:

(i) moving the first set forward and up;

(ii) moving the second set forward and up;

(iii) lowering the first set; and (iv) moving the first set forward and up.

26. The method of claim 25, wherein lowering the first set comprises lowering the first set to contact the floor surface on which the robotic system is arranged.

27. The method of claim 25, comprising, after (iv):

(v) lowering the second set;

(vi) moving the second set forward and up; and continuing to repeat (iii)-(vi) while moving the robotic system forward.

28. The method of claim 25, wherein moving the first set forward and up comprises moving the first set forward by between 1 mm and 10 mm.

29. The method of claim 25, wherein the first set of one or more wedge blocks and the second set of one or more wedge blocks alternate with one another along the lateral direction.

* * * * *